US006587618B2

(12) United States Patent
Raguin et al.

(10) Patent No.: US 6,587,618 B2
(45) Date of Patent: Jul. 1, 2003

(54) COLLIMATOR ARRAY AND METHOD AND SYSTEM FOR ALIGNING OPTICAL FIBERS TO A LENS ARRAY

(75) Inventors: Daniel H. Raguin, Spencerport, NY (US); Theodore J. Tiberio, Hilton, NY (US); Bradley J. Ward, Pittsford, NY (US); Steve Chakmakjian, Honeoye Falls, NY (US); Nestor Farmiga, Rochester, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/845,558

(22) Filed: Apr. 30, 2001

(65) Prior Publication Data

US 2002/0131699 A1 Sep. 19, 2002

Related U.S. Application Data

(60) Provisional application No. 60/276,320, filed on Mar. 16, 2001.

(51) Int. Cl.[7] .............................................. G02B 6/32
(52) U.S. Cl. .......................................... 385/33; 385/80
(58) Field of Search ................................ 385/33, 79, 80

(56) References Cited

U.S. PATENT DOCUMENTS

| 4,074,933 A | * | 2/1978 | Yevick ........................ 353/120 |
| 4,509,827 A | | 4/1985 | Cowen et al. ............... 356/153 |
| 4,545,643 A | | 10/1985 | Young et al. ................. 385/78 |
| 4,637,683 A | | 1/1987 | Asawa ........................ 356/138 |
| 4,746,195 A | | 5/1988 | Auracher et al. ............. 385/52 |
| 4,835,078 A | * | 5/1989 | Harvey ........................ 250/548 |
| 5,009,482 A | | 4/1991 | Lincoln ........................ 385/35 |
| 5,281,301 A | * | 1/1994 | Basavanhally ............... 156/182 |
| 5,346,583 A | | 9/1994 | Basavanhally ............... 216/26 |
| 6,328,482 B1 | * | 12/2001 | Jian ............................ 385/88 |
| 2001/0021287 A1 | * | 9/2001 | Jewell et al. ................. 385/14 |

FOREIGN PATENT DOCUMENTS

EP          0 619 505 B1     11/1999

* cited by examiner

Primary Examiner—Lynn D. Feild
Assistant Examiner—Hae Moon Hyeon
(74) Attorney, Agent, or Firm—Gregory V. Bean

(57) ABSTRACT

A method for aligning optical fibers to a lens array is provided, including, providing a planar reflective surface facing the front surface of lens array, locating one end of a fiber adjacent the back surface of the substrate upon which the lens array is formed or integrated to face one of the lenses of the array, propagating light through the fiber and the lens facing the fiber to the planar reflective surface, receiving returned reflected light from the reflective surface through the fiber and the lens facing the fiber, and then adjusting the position of the fiber to change the amount of the returned reflected light received by the fiber to determine when the fiber is at a position which provides a maximum amount or power of the returned reflected light, thereby aligning the end of the fiber to the focal point of the lens. The fiber is attached to the substrate at that position, such as by an adhesive material, and the method repeated for each fiber to a different lens of the array. A ferrule may be provided about each end of the fibers attached to the substrate. The ferrule may have one or more regions for retaining excessive adhesive joining the fiber to the lens array to avoid adhesive protruding upon the back surface of the substrate and interfering with placement of other fibers to the lens array. Manual and automated systems in accordance with this method are provided. A collimator array is further provided having a lens array with aligned attached optical fibers.

43 Claims, 14 Drawing Sheets

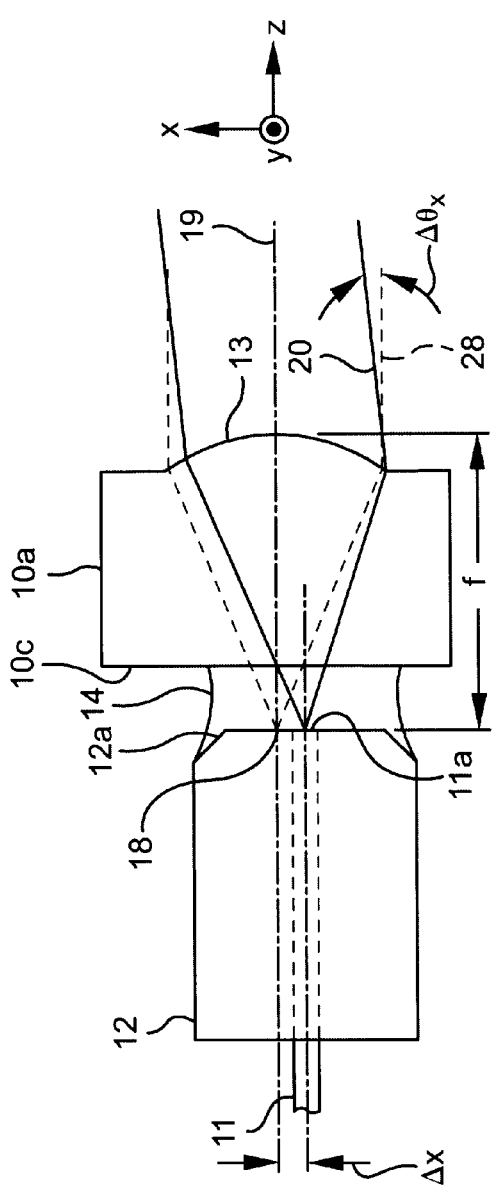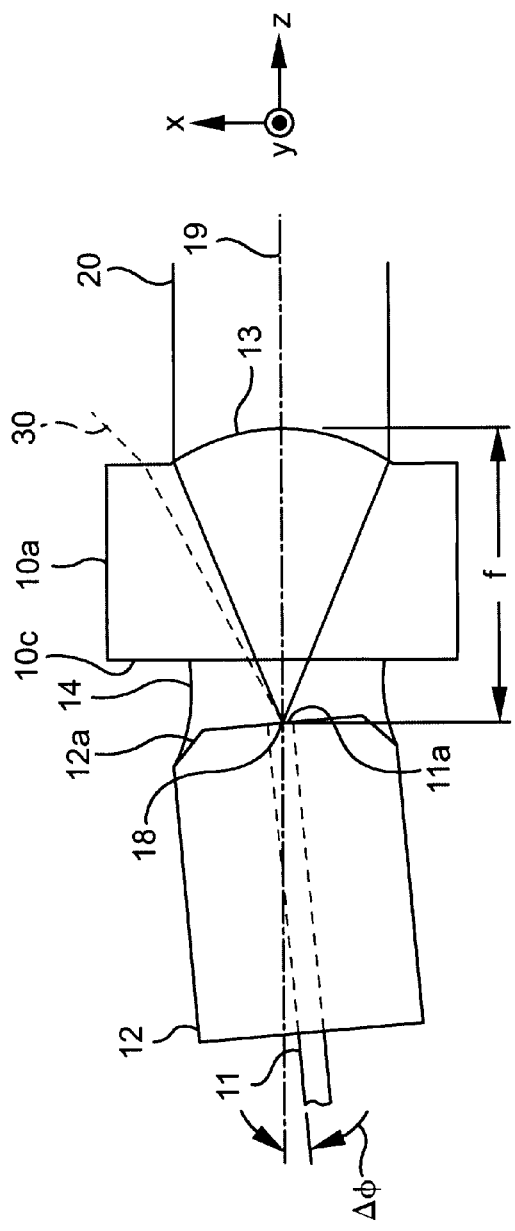

COLLIMATOR ARRAY AND METHOD AND SYSTEM FOR ALIGNING OPTICAL FIBERS TO A LENS ARRAY

DESCRIPTION

This application claims the benefit of U.S. Provisional Patent Application No. 60/276,320, filed Mar. 16, 2001, which is herein incorporated by reference.

FIELD OF THE INVENTION

The present invention relates to a method and system for aligning optical fibers to a lens array, and relates particularly to, a method and system for aligning optical fibers to a lens array in which each fiber is aligned at the focal point of a different lens of the array and then attached to the array, such that beams emitted from lenses of the array are pointing in the same direction, i.e., parallel to each other, when light is provided to their respective fibers. The invention further relates to a collimator array provided by the assembly of the lens array and such aligned optical fibers.

BACKGROUND OF THE INVENTION

In the fabrication of optical devices, it is often desirable to produce a set of collimated optical signals (e.g., beams), each encoded with information from a different source. Monolithic one or two-dimensional arrays of collimating elements may be used in which each collimating element is coupled to a different optical path (e.g. an optical fiber) to provide this set of collimated optical signals. Such a lens array, referred to as a microlens array herein, may consist of a plurality of lens elements formed into a single substrate, or plate, of material, or integrated onto such substrate. This material may be, for example, of plastic (polymers), glass, silicon, or silica. Each optical fiber is attached to the back surface of the substrate for illuminating a different one of the lenses in the array. The end of each optical fiber should be aligned at the focal point of its respective lens to enable optimal light beam collimation, focusing, or maximum light coupling (minimum insertion loss) into another similarly produced lens. Moreover, such alignment should provide collimated beams aligned parallel to each other from lenses when light is provided to their respective fibers. Positioning the optical fibers so that the optical beams emerging from the collimator array are highly collimated and collimated parallel to each other is a difficult task, becoming even more difficult with increased density of lens in the array.

One possible method of alignment is to use a complex structure of a matrix of optical fibers which may be provided by threading optical fibers into holes of a substrate and then polish the ends of the fibers to be aligned to the array. The complex structure is oriented and attached to the lenses of the array to couple illumination from fibers to lenses of the array. This however does not assure that the ends of the fibers are each properly located at the focal point of each lens, or that one or more of the ends of the fibers are not tilted to effect orientation of beams from lenses.

The complex structure for fiber alignment may be fabricated into one side of the substrate containing the microlens array. For example, U.S. Pat. No. 5,346,583 describes a method for aligning optical fibers with a microlens array in which one side of a substrate contains the microlens array and the other side has an array of circular apertures each aligned with the central axis of one of the lenses of the array. Optical fibers are inserted into these apertures, such that the ends of the fibers are aligned in a common plane with respect to the lenses. The substrates' sides are produced by a photolithographic mask and etching processes on each side of the substrate. This method thus requires two masks, which must be precisely aligned with each other, otherwise the central axis of the lenses will not align with the circular apertures. Laser beams are directed through a slot in each mask for mask-to-mask alignment. This may improve enmasse alignment of optical fibers, but such manufacture increases the cost of the microlens array, and does not account for variations which often occur in the focal length between different microlenses of the array. Thus, it would be desirable to align multiple fibers to a microlens array, without requiring a complex structure for enmasse fiber alignment.

In fiber optic connections, techniques have been developed for aligning an individual optical fiber to a GRIN (graduated refractive index) lens. For example, in U.S. Pat. Nos. 4,509,827 and 4,545,643, a mirrored surface is positioned substantially orthogonal relative to the axis of a GRIN lens to autocollimate a light beam transmitted through a fiber. The fiber is positioned relative to the lens such that the returned signals from the mirrored surface is maximized. An adhesive then secures the fiber to the lens. In a further example of fiber optics connection, U.S. Pat. No. 4,637,683 aligns an optical fiber to a GRIN lens having a reflective surface coating on the side of the lens opposite from the fiber, where the reflective surface provides a reference plane. The optical fiber is positioned relative to the GRIN lens to maximize the reflected light from the reference plane. Such methods of U.S. Pat. Nos. 4,509,827, 4,545,643 and 4,637,683 are limited to alignment of a single fiber to a single GRIN lens rather than alignment of multiple optical fibers to a microlens array.

Other alignment methods for aligning an individual fiber to a lens use transmitted, rather than reflected light. U.S. Pat. No. 5,009,482, describes joining an optical fiber with a spherical lens by detecting the amount of light transmitted by the lens into the fiber, and iteratively positioning the fiber relative to the lens to maximize the amount of detected light. In European Pat. Publication EP 0619505B1, multiple separate GRIN lens are aligned with optical fibers in a structure mechanically providing an optical collimator array. Light is passed along the optical fibers and beams emitted from the GRIN lenses are imaged on a CCD camera and shown on a monitor coupled to the CCD camera. The centers of the beams in the image are used to adjust the position of fibers and lens to provide the desired output from the optical collimation array.

Often optical fiber have a ferrule coupled about one of their ends having a front surface planar with the end of the fiber to be attached to a microlens array. In attaching individual fibers to the array, excess adhesive used in joining the fiber to the array protrudes from the location where the ferrule attaches to the back surface of the lens array's substrate. Often such protruding adhesive forms a bead or runs along the back surface of the array's substrate. This can be a problem since the protruding adhesive can interfere with attachment of other neighboring fibers to the array. Thus, it would be desirable to avoid protruding adhesive in the attachment of fibers to the microlens array.

SUMMARY OF THE INVENTION

Accordingly, it is the principal object of the present invention to provide an improved method and system for aligning optical fibers to a lens array in which each fiber is aligned to a different lens to obtain proper collimation, focusing, or maximum light coupling, without enmasse alignment techniques of the prior art.

It is another object of the present invention to provide an improved method and system for aligning optical fibers to a lens array to obtain optical signals or beams aligned parallel to each other from lenses of the array when respective fibers receive illumination providing such optical signals.

A further object of the present invention is to provide an improved method and system for aligning optical fibers to a lens array in which alignment can be performed either manually, or automatically by a programmed computer.

A still further object of the present invention is to provide an improved method and system for aligning optical fibers to a lens array which avoid excessive adhesive used in joining fibers to the lens array from protruding upon the back surface of the lens array and interfering with attachment of other neighboring fibers to the array.

Briefly described, the present invention embodies a method for aligning optical fibers to a lens array in which the lens array has a substrate with a front surface providing a plurality of lenses in the array, and a back surface for input (or output) of light for the lenses. The method includes providing a planar reflective surface facing the front surface of the lens array, aligning the planar reflective surface substantially parallel with the front surface of the lens array such that the optical axes of the lenses of the array are substantially perpendicular to the planar reflective surface, locating the end of one of the fibers to be aligned adjacent the back surface of the lens array to face one of the lenses of the array, applying an adhesive material, such as ultraviolet light curable liquid adhesive, to the end the fiber, propagating light through the fiber and the lens facing the fiber to the reflective surface, and receiving returned reflected light from the reflective surface through the one of the fibers and the lens facing the fiber, adjusting the position the end of the one of the fibers to change the amount of the returned reflected light received by the fiber to determine when the end of the fiber is at a position which provides a maximum (or peak) amount (or power) of the returned reflected light, and attaching the end of the one of the fibers to the back surface of lens array at the position which provides a maximum amount (or power) of the returned reflected light. Such attachment may be facilitated by using a radiation source that provides ultraviolet light to cure liquid adhesive, in the case where an ultraviolet light curable adhesive is used. The propagating, adjusting, and attaching steps are repeated for each of the fibers to different ones of the lenses of the array until all fibers are coupled to the lenses of the array. Thus, a single reflective surface is provided and each fiber is aligned to maximize the reflected light from this reflective surface received through the fiber and its respective lens, and then the fiber is attached to the substrate. Since each of the aligned fibers and lenses are aligned to the same reflective surface, their beams will be parallel to each other when their respective fibers are illuminated. Although preferably the planar reflective surface is substantially parallel with the substrate of the lens array, the reflective surface need only be in a fixed relationship with the lens array during alignment and attachment of the fibers to the substrate to assure that such beams will be parallel with respect to each other.

A ferrule, or other type of coupler or connector, is provided about each end of the fibers when aligned and attached to the substrate of the lens array. Each ferrule may have one or more regions (structures or features) for retaining excessive adhesive joining the fiber to the lens array to avoid such excessive adhesive protruding upon the back surface of the substrate and interfering with placement of other fibers to the lens array. These regions are located at the front portion or surface of the ferrule facing the array's substrate and provided by a chamfered front surface, a groove providing an annular canal in the front surface of the ferrule, or a combination thereof. The front surface of each ferrule may be angled with respect to the back surface of the substrate to provide the regions with or without being chamfered or having a canal. Alternatively, the fibers may be attached to the lens array without ferrules.

A system embodying the method for aligning optical fibers to a lens (or microlens) array is also provided, including, a lens array having a substrate with a back surface and a front surface providing the lenses of the array, optical fibers each having two ends in which one of ends may be positioned in a ferrule to provide a ferruled fiber, a reference member having a planar reflective surface facing the front surface of the lens array in which the front surface of the lens array is parallel to the reflective surface of the reference member such that the optical axes of the lenses of the array are substantially perpendicular to the planar reflective surface. A vacuum actuated holder is provided capable of retaining the fiber in its ferrule. The holder is pivotable such that when a fiber in its ferrule is retained, the ferrule faces the substrate in a fixed relationship, preferably parallel, to the substrate. Each of the fibers are individually loaded onto the holder and positioned to face a different one of the lenses of the substrate, in which the holder has translation stages capable of moving the end of the fiber in x,y,z orthogonal dimensions. At the end of the fiber an adhesive material is applied, such as an ultraviolet light curable adhesive, with a precise syringe. Each fiber when located adjacent the substrate, a laser beam is directed (propagated) through the fiber and the lens facing the fiber to the reflective surface, and returned reflected light from the reflective surface of the reference member passes through the fiber and the lens facing the fiber onto a detector. Optics are provided to pass light to each fiber and direct returned reflected light to a detector for measuring the amount (or power) of the reflected light. The stages coupled to the holder are each iteratively moved in x, y, or z to adjust the position of the end of the fiber to change the amount (or power) of returned reflected light received by the fiber to determine when the fiber in the coupler has moved to a position which provides a maximum amount (or power) of returned reflected light. The fiber is bonded to the back surface of the substrate at the position which provides a maximum amount (or power) of returned reflected light, such as applying ultraviolet light when an ultraviolet curable adhesive is used. The fiber is released from holder and another fiber is positioned in the holder, and then aligned and bonded to the array's substrate, and so forth until all fibers are attached to the array. For each fiber to be aligned, the lens array is indexed to the next lens in the array by adjusting the position of the substrate of the lens array by using x,y translation stages coupled to the substrate, or the holder of the fiber may be moved using its x,y stages to index to the next lens.

An autocollimator, interferometer, or other aligning mechanism, may be used to locate a reference member providing the planar reflective surface substantially parallel with respect to one or more flat reflective areas on the front or back surface of the lens array's substrate. The autocollimator or interferometer may be used during the alignment of each fiber to assure that the reflective surface is maintained substantially parallel with the substrate.

The movement of the stages of the holder to locate the position of maximum light reflectance may be carried out manually, or automatically by a computer system coupled to the stages and programmed to locate the maximum level (or power) of reflected light. The computer system operates the stages of the holder as a robotic arm to pick up each fiber by its ferrule from a fixture or cassette and locate and align the fiber when in the holder to one of the lenses in the array, as described above. The computer system controls vacuum to holder to retain the fiber in the holder and release the fiber after attachment to the lens array. The computer system may further control stages coupled to the precision syringe, such that prior to alignment of each fiber facing the lens array, the tip of the syringe may be positioned and adhesive applied to the fiber. After alignment of each fiber to a lens array, the computer system may also control the light source for curing the adhesive to bond the fiber to the substrate.

In addition to providing proper alignment, the system may be used to enable measurement of insertion loss for each fiber-lens pair as the lens array is assembled with fibers. This may be achieved by recording the power of the reflected light after each fiber is aligned and attached to the substrate.

A collimator array is also provided having such aligned optical fibers including, an array of lenses located on a substrate having a substantially flat back surface, and optical fibers each having one end coupled by an adhesive material to the back surface of the substrate in optical communication to a different one of the lenses in which each of the fiber are individually positioned with respect to the array. Each of the fibers may have a ferrule having regions for retaining excess adhesive material joining the fiber to the lens array to avoid the adhesive protruding upon the back surface of the substrate.

Although the lens array is described as having convex lens or elements for collimating light from fibers, and are not limited to collimating lenses, as such lens arrays may have lens for converging (or focusing) light. Further, the lens may operate to receive optical signals into the fibers or send optical signals received from the fibers. The lenses of the array may be surface relief, gradient index, or GRIN type lenses, or a combination thereof.

BRIEF DESCRIPTION OF THE DRAWINGS

The foregoing objects, features and advantages of the invention will become more apparent from a reading of the following description in connection with the accompanying drawings, in which:

FIGS. 3–5 are optical diagrams similar to FIG. 2 showing examples of different optical misalignment of the fiber with respect to one of the lens of the array and its negative effect on collimating light from the lens;

DETAILED DESCRIPTION OF THE INVENTION

Figure 1A:
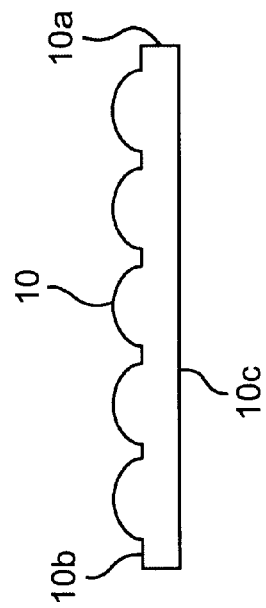
FIG. 1A is a side view of the example of a convex lens array of FIG. 1.
Figure 1:
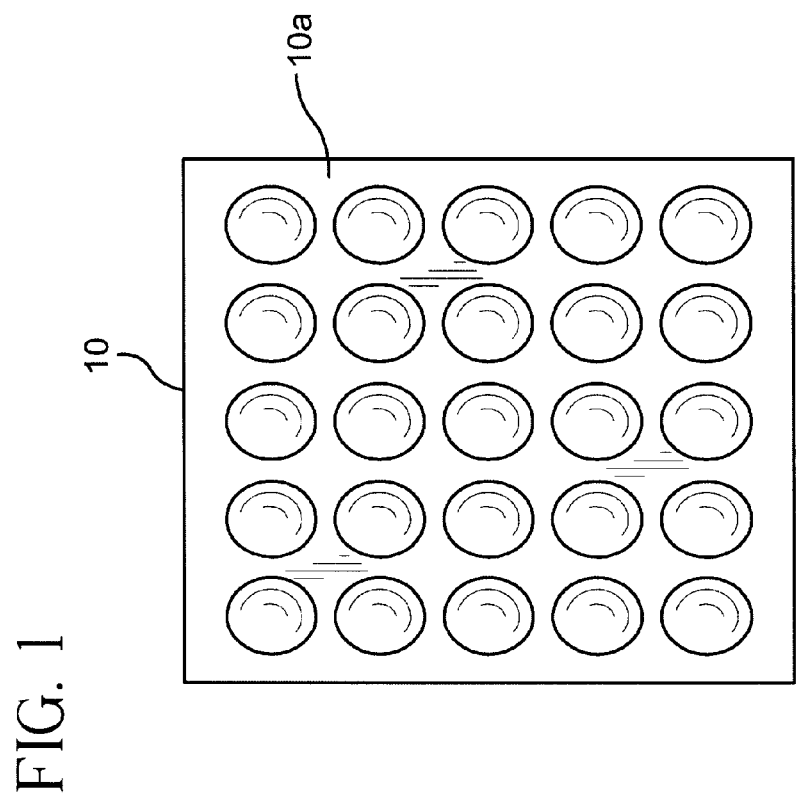
FIG. 1 is a front view of an example of the convex lens array having a substrate.
Figure 1B:
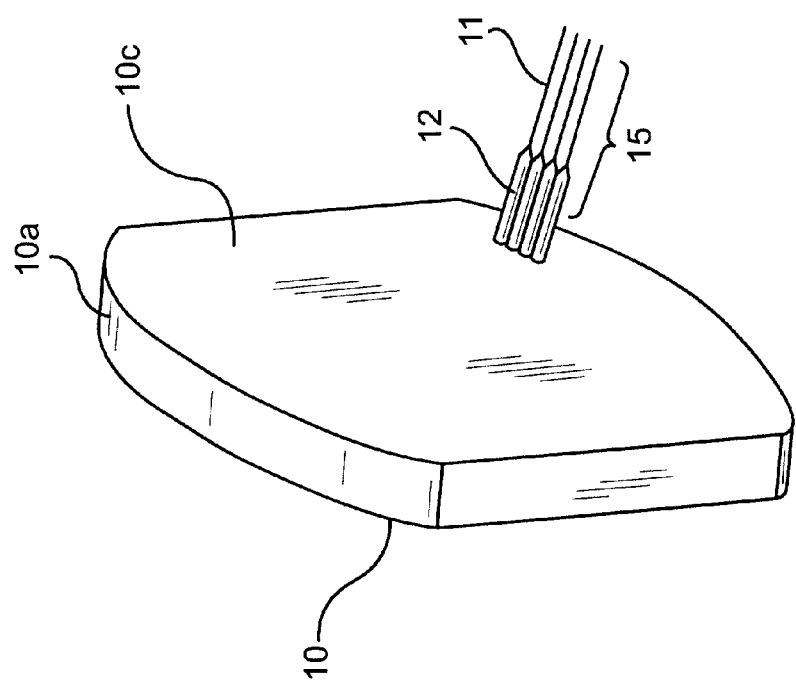
FIG. 1B is a front perspective view of another example of a lens array.

Referring to FIGS. 1, 1A, and 1B, a two-dimensional array 10 of collimating elements or convex lenses is shown. The array is often referred as a microlens array. Array 10 has a substrate or plate 10a having a front surface 10b providing the multiple lenses of the array and a back surface 10c. The array 10 may be fabricated by one of several methods. For example, the convex lenses may be made by embossing a set of convex lens features into a plate of plastic or glass, or, the convex lens features may be made from glass or plastic by casting into the appropriate mold, or the surface-relief of the lenses may be etched into the substrate material. Also, such arrays may be made in a hybrid substrate, for example, by embossing convex features into a thin layer of polymer on a substrate plate of fused silica. The present invention is not limited to an array 10 of any particular method of fabrication or material. For example, the array 10 could be a plurality of GRIN collimators positioned in a fixed array. For use in optical communications devices or systems, it is preferable that the optical axes of the individual collimating lens are substantially parallel to each other. Each individual collimating lens of array 10 has an input on the back surface 10c of the array, and an output 10b on the front surface of the array. Although a two-dimensional array of lens is described herein, the array 10 may be one or two-dimensional. Lenses of the array 10 are described herein as producing collimated light, but the light may be collimated or focused per a specific optical design of the lenses in array 10. Light may represent wavelength or wavelength bands of electromagnetic radiation, which may include visible or non-visible wavelengths.

Figure 1C:
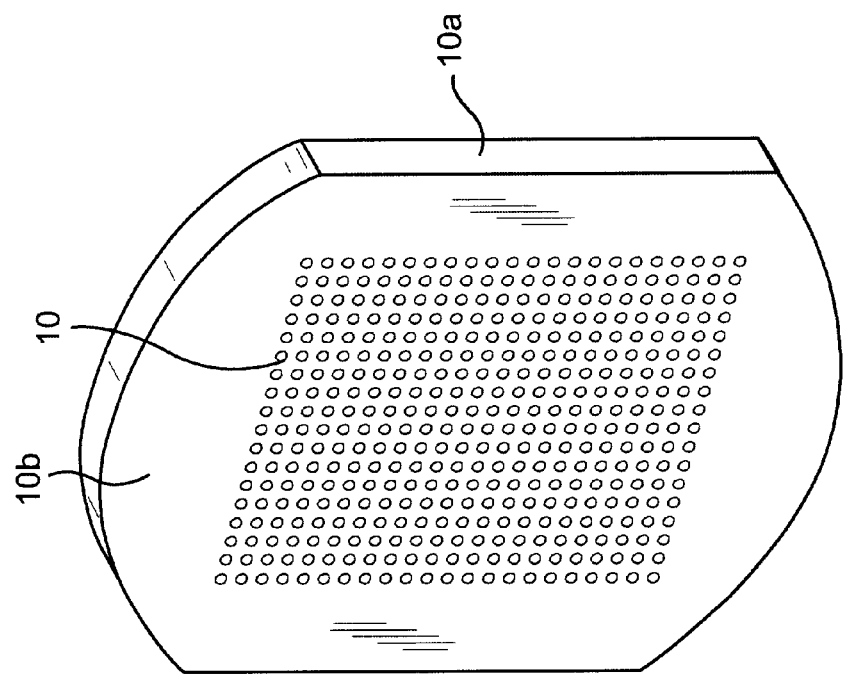
FIG. 1C is a back perspective view of the lens array of FIG. 1B in which four ferruled fibers are shown attached.

Referring to FIG. 1C, the lens array 10 is shown illustrating the attachment of optical fiber elements 15 to back surface 10c of the array's substrate 10a. Each optical fiber element 15 has a fiber 11 having an input end and an output end. The output end of the fiber 11 is held in a ferrule 12 which has a front surface substantially planar and smooth with the output end of fiber 11. Each one of the fiber elements 15 is aligned and attached to a different one of the lenses of the array 10, as will be described below. For purposes of illustration, only four attached fiber elements 15 are shown in FIG. 1C. For example, the ferrules 12 may be made of $SiO_2$ or ceramic material, 1.8 mm in diameter, 10–13 mm in length, where the fiber 11 is 125 $\mu$m in diameter and received in a centered hole 127 $\mu$m in diameter. The attached fiber element 15 may be said to pigtail to the back surface 10c of array 10. Alternatively, each of the fiber elements 15 may be provided by a fiber 11 without a ferrule 12 at its output end.

Figure 2:
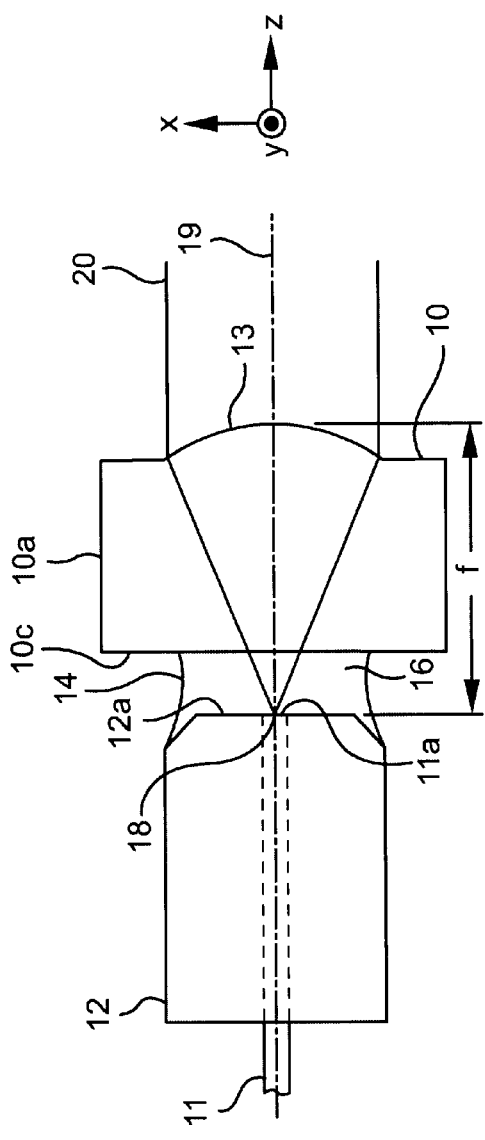
FIG. 2 is an optical diagram of the end of an optical fiber in a ferrule adhesively coupled to one of the lens of the array of FIGS. 1 and 1B in which proper optical alignment is provided to obtain a collimated light.
Figure 3:
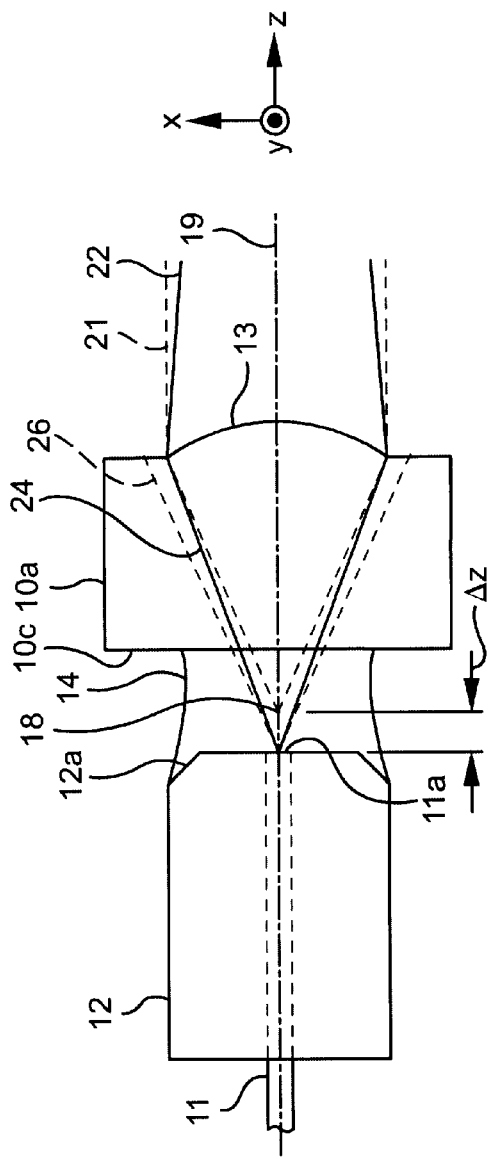

Proper alignment of each attached fiber 11 is important to enabling desired collimation of light by the lens of array 10 which is in optical communication to receive illumination from the fiber. FIG. 2 optically illustrates the proper alignment of one of optical fiber elements 15 to a single lens 13 of the array 10. For illustration purposes, only a single lens is shown. The collimated radiation (or beam) 20 is shown from the lens 13 illuminated by light received from the fiber. The beam waist of lens 13 after the fiber 11 may be located at any arbitrary position in z in the x,y,z coordinate system shown in the figures. Fiber 11 in ferrule 12 is attached after alignment to a lens 10 using an adhesive material or polymer 14 as an intermediary between the front surface 12a of the ferrule 12 and the back surface 10c of substrate 10a. Preferably, the adhesive material has an index of refraction that suitably matches that of the fiber mode and that of the lens array's substrate for the wavelengths of illumination to be used, such that after the lens array is assembled to fibers to provide a collimator array, back reflections and insertion losses are minimized. The adhesive 14 may be applied as a liquid on the front surface 12a of the ferrule 12, and then brought a distance to provide a gap 16 into which the adhesive 14 is located between the ferrule 12 and the substrate 10a and contacts the substrate to provide sufficient adhesion when the adhesive is fixed, such as by ultraviolet (UV) curing in the case of a UV adhesive. For example, this gap may initially be 100 $\mu$m, but depends on the focal length f of each lens in the array 10 and the thickness of substrate 10a. When the end of the fiber 11 is aligned, its output end 11a is at the focal point 18 of the lens 13 and the fiber is coaligned (or coaxial) to the optical axis 19 of lens 13, the radiation or light 20 emitted from the fiber 11 is properly collimated by the lens allowing maximum light coupling (or minimum insertion loss) into another, similarly produced lens. FIGS. 3 to 5 illustrate the optical effects of independent mechanical alignment errors in x, y, z, θ and φ, where θ and φ are defined in FIGS. 4 and 5, respectively. Any combination of these alignment errors may occur simultaneously.

In FIG. 3, the ferrule 12 is displaced along the z-axis by a distance Δz away from the focal point 18 of the lens 13. Instead of the radiation 20 being collimated (as indicated by lines 21), the radiation emerging from the fiber 11 is focused by the lens 13 (as indicated by rays 22). There is also a loss of light since the effective numerical aperture of the lens 13 has been decreased so that only rays 24 that are closer to the optic axis 19 will be captured by the lens. A certain portion of the radiation emitted by the fiber is clipped (as indicated by dashed lines 26), and is not focused by the lens.

In FIG. 4, the ferrule 12 is displaced along the x-axis by a distance Δx away from the focal point 18. In this case, a pointing error occurs. To first-order the light is still collimated but the radiation 20 is pointing at an angle $\Delta\theta_x$ with respect to the desired properly aligned beam (as indicated by dashed lines 28). The angular pointing error $\Delta\theta_x$ from the z-axis in the x direction is $\Delta\theta_x=\Delta x/f$, where f is the focal length of the lens. Although not shown, a similar effect results for a displacement along the y-axis by a distance Δy away from the focal point 18. With no errors in x and the only error being in y, the resulting beam has an angular pointing error from the z-axis along the y direction of $\Delta\theta_y=\Delta y/f$.

In FIG. 5, the ferrule 12 is rotated by an angle Δφ with respect to the optic axis 19. As this is the only error, the radiation exiting the fiber 11 is still located at the focal point 18 of the lens 13. Since the fiber end 11a is still located at the focal point 18 of lens 13, the radiation 20 is still collimated and propagating collinearly to the optic axis 19 of the lens. However not all of the light is collimated. Some rays 30 will miss lens 13, thereby increasing the insertion loss (IL).

Figure 6A:
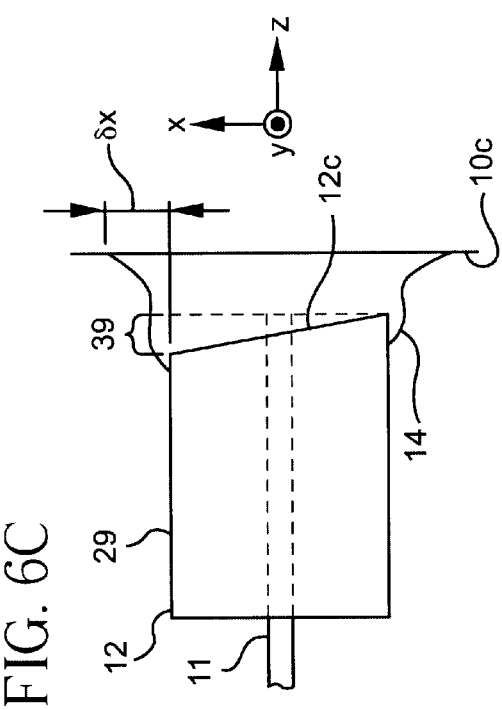
FIG. 6A is a schematic view of the end of an optical fiber in a ferrule adhesively coupled to the back surface of the substrate of the lens array showing the ferrule having no regions, i.e., structures along its front surface, to retain excessive adhesive material.

Referring to FIG. 6A, a fiber 11 attached to a ferrule 12 that is bonded by adhesive material 14 to back surface 10c of the substrate 10a is shown. This ferrule has a front surface 12b facing the substrate 10a without any regions (structures or features) to retain excessive adhesive material. As a result, the adhesive material 14 wicks up sides 29 of the ferrule 12, and the adhesive material forms a protruding bead 32 by running along the substrate's back surface 10c so that the adhesive material 14 extends a distance δx from the ferrule. This effect, in theory, can be avoided if one is able to minimize the amount of adhesive material 14 used. In practice, however, the focal length of each lens in an array 10, or on a sample-to-sample basis, is not perfectly uniform. Thus, the size of gap 16 (FIG. 2) should be adjusted for different lenses of the array 10 to minimize the insertion loss due to possible misalignment of the output end 11a of fibers 11 to the focal point of the lenses of array 10. As a consequence, sufficient adhesive material 14 needs to be deposited in the interfacing gap 16 between the ferrule 12 and the substrate 10a to accommodate the range of focal lengths of the lenses. When lenses with shorter focal lengths than the average of the focal lengths of the lenses of the array 10 are aligned to fibers, they require that ferrules 12 of such fibers be brought closer to the substrate's surface 10c, thereby promoting the adhesive material 14 to squish out and wick around the ferrule. Another problem is that when assembling high-density arrays 10, in terms of the spacing between lenses of the array, very little space may be present between a ferrule's nearest neighboring ferrule (such as 0.5 mm or less) on the back surface 10c of the substrate. Consequently, any adhesive material 14 that wicks up the sides of the ferrule, or along this back surface 10c, can interfere with fiber connection to adjacent lenses.

To avoid this problem, one or more regions to retain excessive adhesive material are provided on the ferrule's front surface facing the substrate. The ferrule 12 may be chamfered to provide front surface 12a, as shown in FIG. 6B (and also in FIGS. 2–5), by having a chamfer (or bevel) 33 around the outer diameter of the ferrule 12 at the front surface 12a to provide an annular region 34 into which excess adhesive material 14 is received. The annular region 34 retains the adhesive material 14 minimizing or preventing it from wicking out the sides of the ferrule, or along the substrate's back surface 10c to form a protruding bead. The chamfer 33 may be provided by grinding or cutting at an angle along the edge 31 of the flat surfaced ferrule of FIG. 6A. For example, this angle may be at approximately 45° to provide an annular region 300 μm in width along the front surface of the ferrule. This allows high-density arrays to be pig-tailed to fibers without adhesive material interfering with nearest neighbor lenses.

Figure 6C:
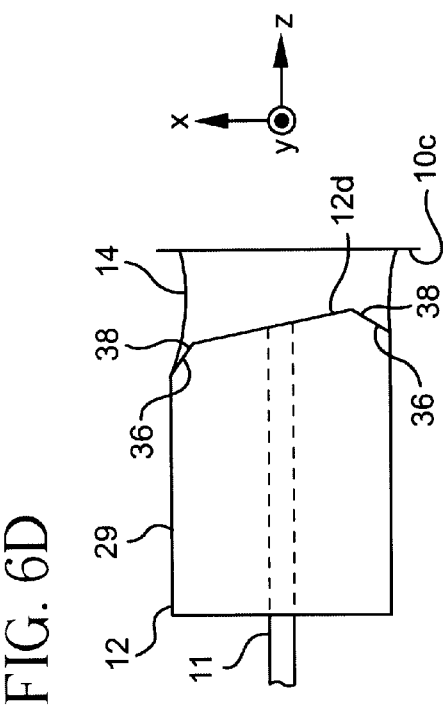
FIG. 6C is a schematic view of the end of an optical fiber in a ferrule adhesively coupled to the back surface of the substrate of the lens array showing the ferrule having an angled front surface and no chamfered regions.
Figure 6B:
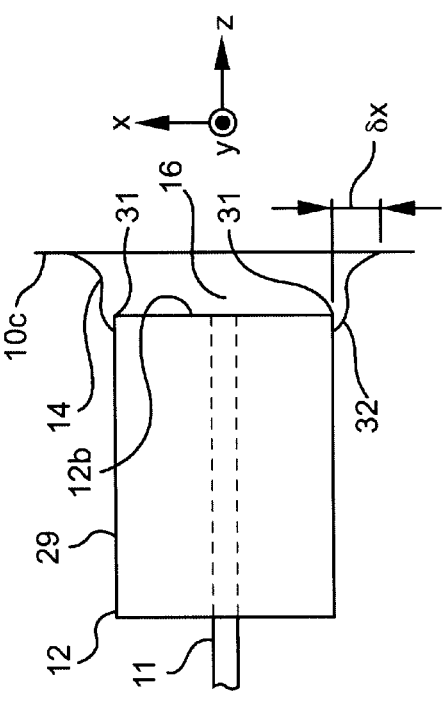
FIG. 6B is a schematic view of the end of an optical fiber in a ferrule adhesively coupled to the back surface of the substrate of the lens array showing the ferrule having a chamfered front surface to provide regions to enable retaining of excessive adhesive material.
Figure 6D:
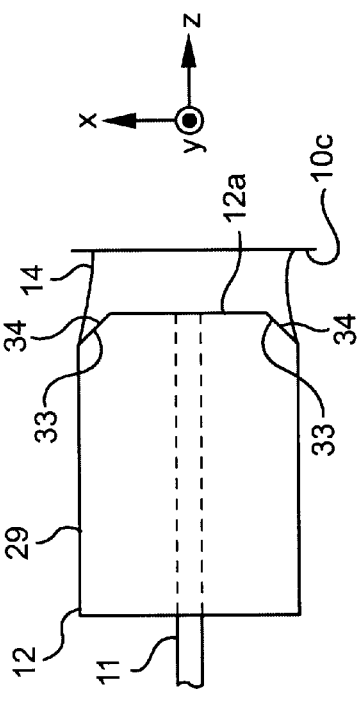
FIG. 6D is a schematic view of the end of an optical fiber in a ferrule adhesively coupled to the back surface of the substrate of the lens array showing the ferrule having an angled front surface with a chamfered front surface to provide regions to enable retaining of excessive adhesive material.
Figure 7:
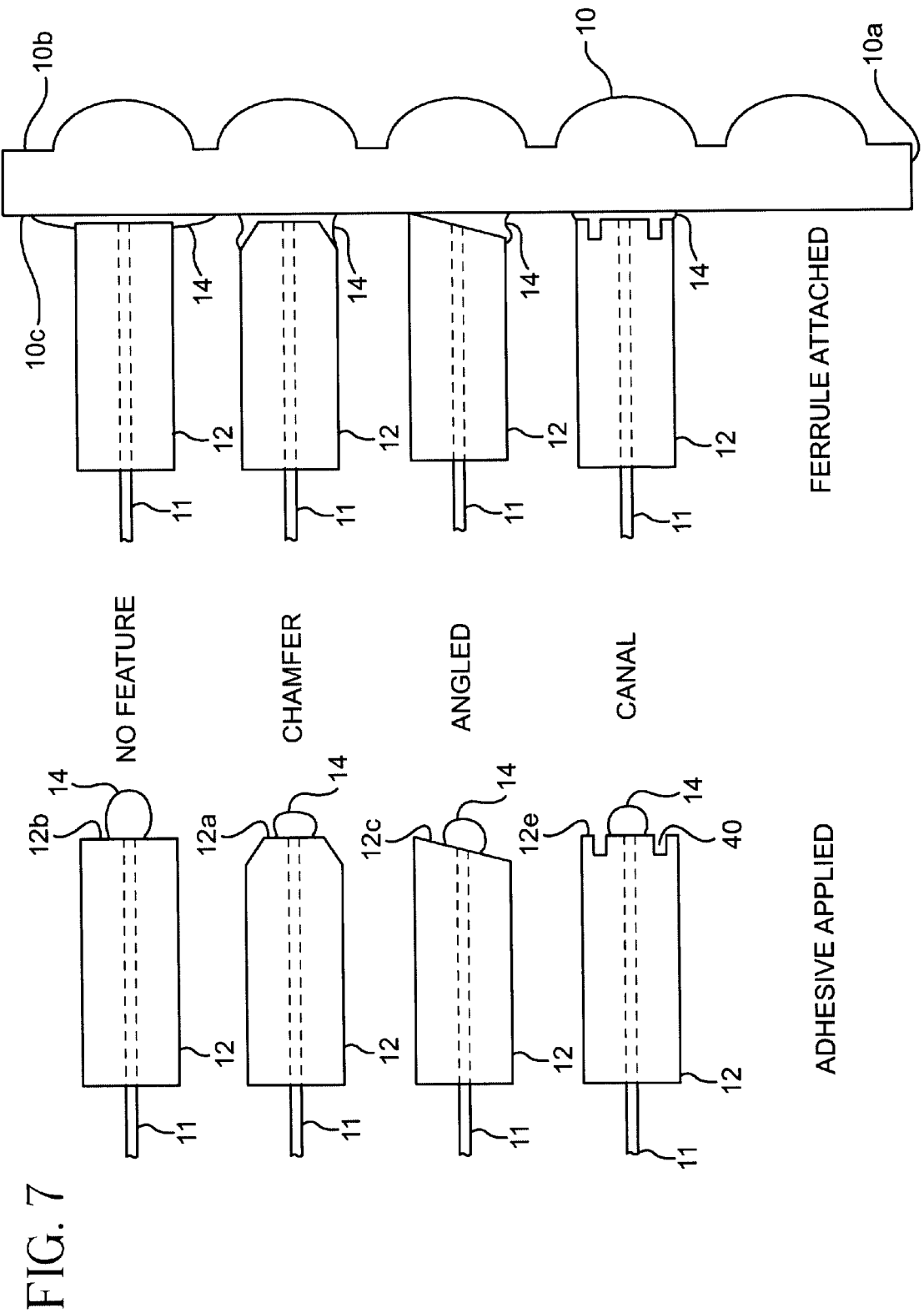
FIG. 7 illustrates the ends of the optical fibers having different types of ferrules with no regions for retaining adhesive material, a chamfered front surface, angled front surface, and annular canal in the front surface of the ferrule when adhesive material is applied to the end of the fiber, and after the ferrules are attached to the lens array's substrate, such as by curing the adhesive material.

Alternatively, ferrule 12 may have an angled (or slanted) front surface 12c as illustrated in FIG. 6C. As with the non-angled ferrule 12 of FIG. 6A, the fiber 11 attached to the angled ferrule will likely have the adhesive material 14 wick along the ferrule's sides and along the back surface 10c of substrate 10a if no adhesive retaining regions are provided. The angled ferrule may have a chamfer 36, as shown in FIG. 6D, to provide a front surface 12d with retaining region 38 for excessive adhesive material 14. When a fiber 11 is attached to an angled ferrule 12 having a chamfer 36 providing region 38 about ferrule's front surface 12d and attached to the back surface 10c of substrate 10a, the adhesive material 14 does not run up the sides of the ferrule and can be controlled so that it does not run along the substrate. However, depending on the amount of adhesive material and the size of the gap between the ferrule and the back surface 10c of the substrate 10a, the angled ferrule of FIG. 6C may itself provide a region for the excess adhesive material without any chamfer, in which the additional space provided by angling the front surface 12a provides a region sufficient to retain excessive adhesive material when the ferrule is attached to the back surface 10c of the substrate 10a. The angled ferrule having front surface 12c without a chamfer is shown, for example, in FIG. 7 which further illustrates a side-by-side comparison of ferrules with adhesive material before and after attachment to the substrate 10a of array 10. Further, FIG. 7 shows an adhesive retaining region provided by an annular groove in the front surface 12e of the ferrule 12 to provide an annular canal 40.

Figure 8:
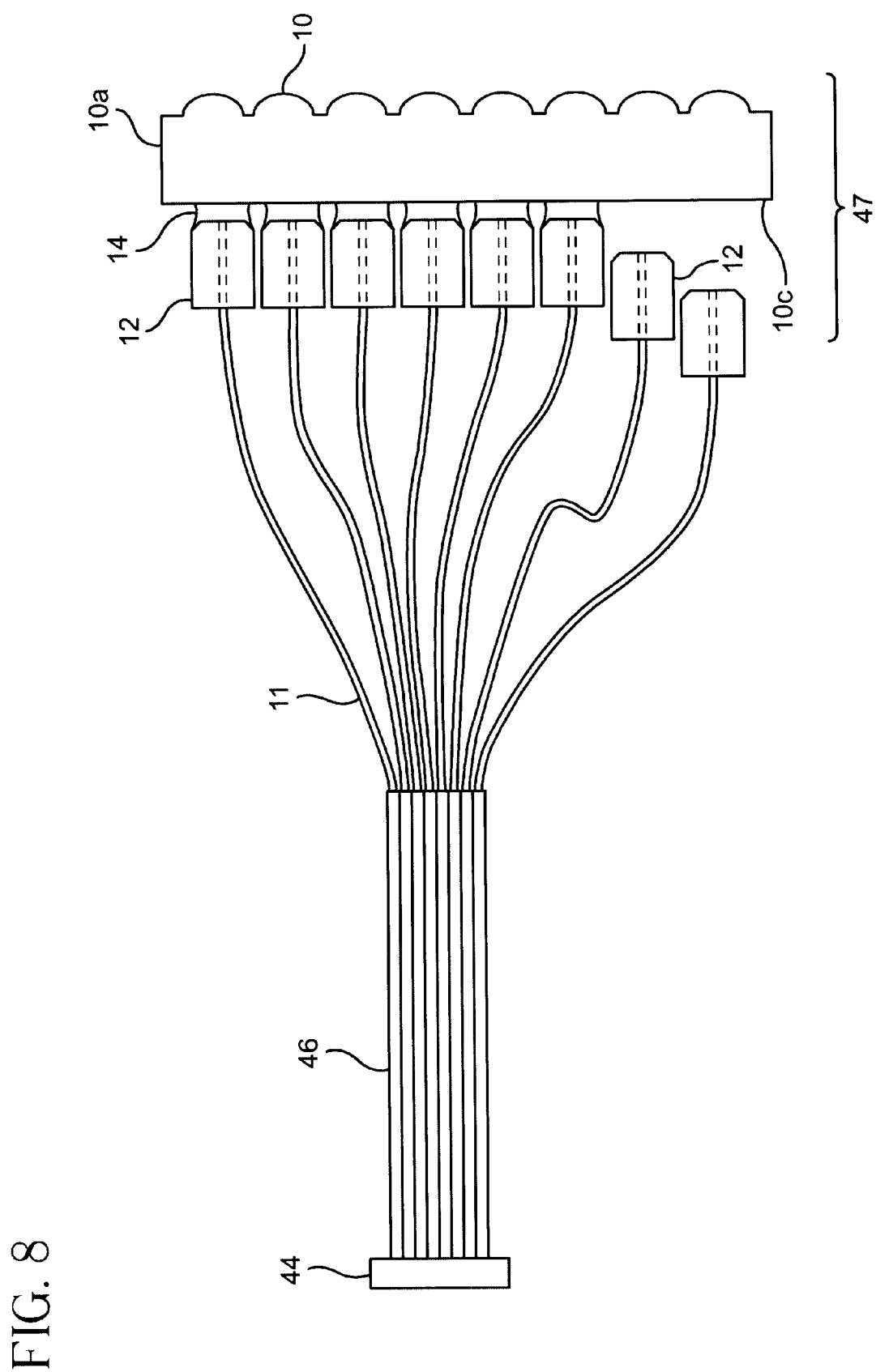
FIG. 8 is a block diagram of the lens array having fibers being attached in which ferrules having chamfered front surfaces of FIG. 6B.

Referring to FIG. 8, the assembly of the lens array 10 is shown during the alignment and attachment of ferruled fibers 11, as will be described below, in which the ferrules have chamfered front surfaces to avoid adhesive material interfering with placement of neighboring ferrules. An array of fibers 11 is provided to the lenses of array 10. In this example, a connector 44, such as an MTP/8 connector, is attached to a ribbon cable 46 to the input end of each fiber. The connector may contain 8 fibers, however, other connectors with different number of fibers may be used. These fibers at a certain location in the ribbon are allowed to separate into individual fibers 11. Ferrules 12 shown in FIG. 8 are illustrated as chamfered, but other front surfaces 12b, 12c, and 12d may also be used. Preferably, the ferrules 12 have one or more of the adhesive retaining regions 34, 38, 39, or 40. The ferrules 12 are aligned and bonded to the back surface of the array substrate 10a. Multiple sets of fibers from multiple connectors may be used depending on the size and dimension of lenses of array 10. Once the fibers 11 are attached to lens array 10, an assembled collimator array 47 is provided.

Figure 9:
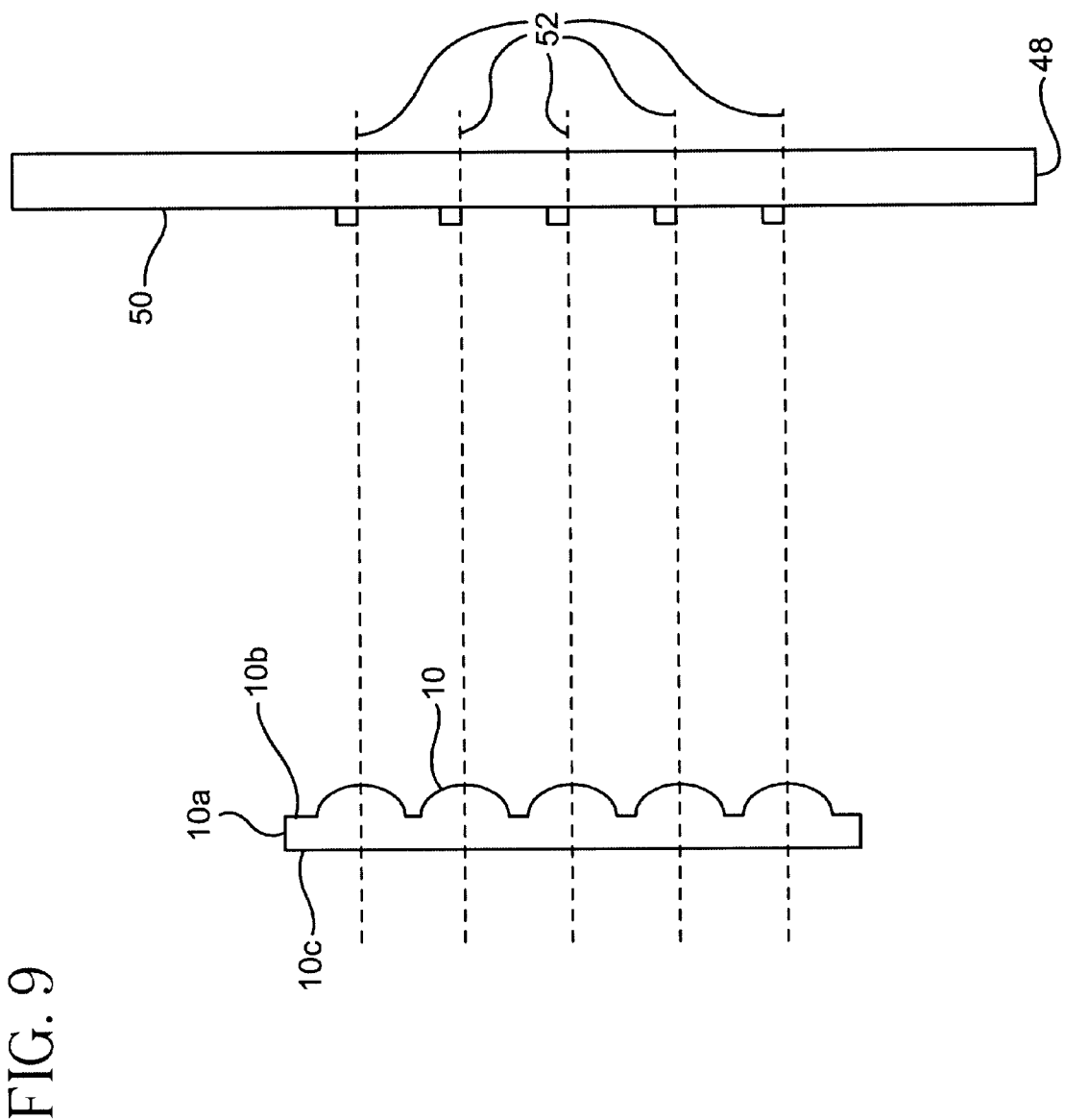
FIG. 9 is a block diagram showing the orientation of the lens array to the reflective surface of a mirror.

Referring to FIGS. 9–12, the method for aligning the optical fiber elements 15 (i.e., fibers 11 in ferrules 12) to the lens array 10 for assembly of the array to such fibers will be described. In the first step, the array 10 is positioned so that its front surface is aligned to a mirror 48 having a planar reflective surface 50, as shown in FIG. 9. The array 10 is aligned so that the optical axes 52 of the lens, which are all substantially parallel to one another, are substantially perpendicular to the reflecting surface 50 of the mirror. This alignment may be passive, for example by using a precisely constructed alignment fixture, or may be active. The mirror 48 is larger than the array 10, which is positioned so that any substantially collimated signal (e.g., beam) emerging from one of the lenses of the array will be reflected by the mirror. To achieve this, the front surface 10a of the lens array 10 at its substrate 10a may be made substantially parallel to the planar reflective surface 50 of the mirror, and thus the optical axes 52 of the lens of array 10 are substantially perpendicular to the planar reflective surface 50.

Optical fiber elements 15 (FIG. 1C) are individually aligned and attached to the array 10, as described below. Although the output of each optical fiber element preferably consists of an end of a optical fiber held by ferrule 12, other configurations may be used, such as a cleaved end of a optical fiber without the ferrule. The ferrules 12 preferably each have one or more of the adhesive retaining regions described earlier. During the alignment process, the input of each optical fiber element is coupled to a source of an optical signal, such as a laser or other illumination source. This optical signal is of a frequency that is substantially reflected by the mirror 48, and is preferably of a frequency comparable to that to be used in the eventual device or system in which the collimator array assembly of the array 10 and attached aligned fibers 11 will be used. Between the input and the output of the optical fiber element 15 are optics, such as a tap element, circulator, or beam splitter, that connect to a monitor, such as a detector, for measuring optical power propagating from the output of the optical fiber element to the input of the optical fiber element, while enabling the propagation of light to the output end.

Figure 10:
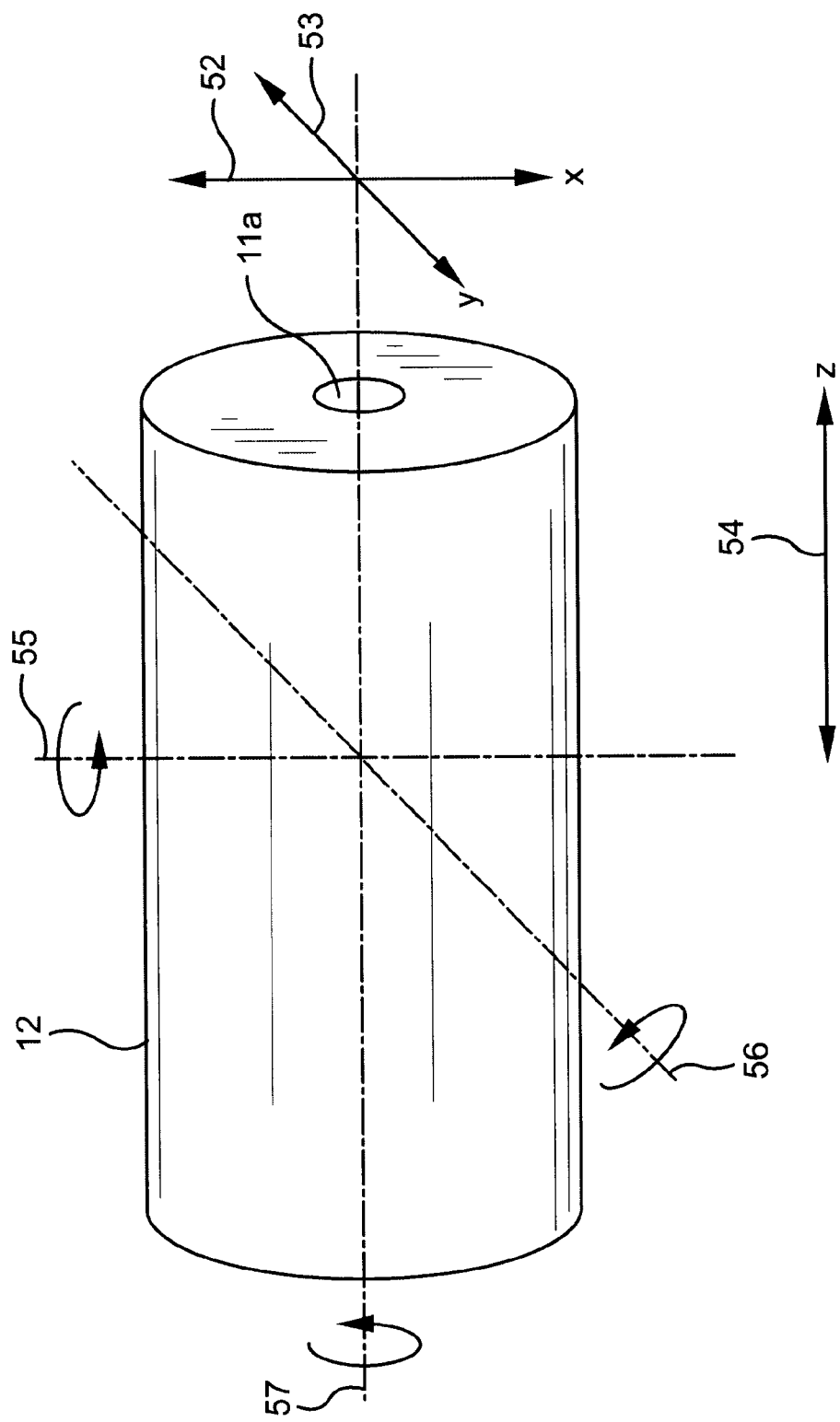
FIG. 10 is side view of a ferrule having an optical fiber showing the different freedoms of movement of the ferrule which may be used in adjusting ferrule's position with respect to the lens array.

To align an optical fiber element 15, the output end of the optical fiber element is held in an alignment tool. The alignment tool allows the position of the output of the optical fiber element to be precisely controlled in three dimensions. Preferably, the alignment tool also allows the angle of the output of the optical fiber element to be controlled by rotation around the three principal axes of the optical fiber element. The preferable degrees of alignment, which include motion along three axes x, y, and z, indicated by bi-directional arrows 52, 53, and 54, and rotation around three axes 55 56, and 57, as shown in FIG. 10. Positioning about rotation axis 57 may be needed when an angled ferrule is present on the fiber, otherwise, such rotation axis 57 may not be required. An optical signal is propagated from a source at the input of the optical fiber element to the output of the optical fiber element. The output end of the optical fiber element may be cleaved or polished normal to, or at an angle, to the fiber's optical axis to ensure efficient propagation of the optical signal from the output into the lens, and optionally to reduce back reflection from the output of the optical fiber element.

A small amount of curable adhesive is applied to the output of the optical fiber element. The adhesive retaining region at the front surface of the ferrule, such described earlier, minimize or prevents the protrusion of the adhesive material beyond the diameter of the ferrule when the ferrule is contacted with the back surface of the array. This allows the application of the adhesive to the ferrule to be less precise, while not allowing the adhesive bead to protrude into the vicinity of ferrules for neighboring lenses.

Figure 11:
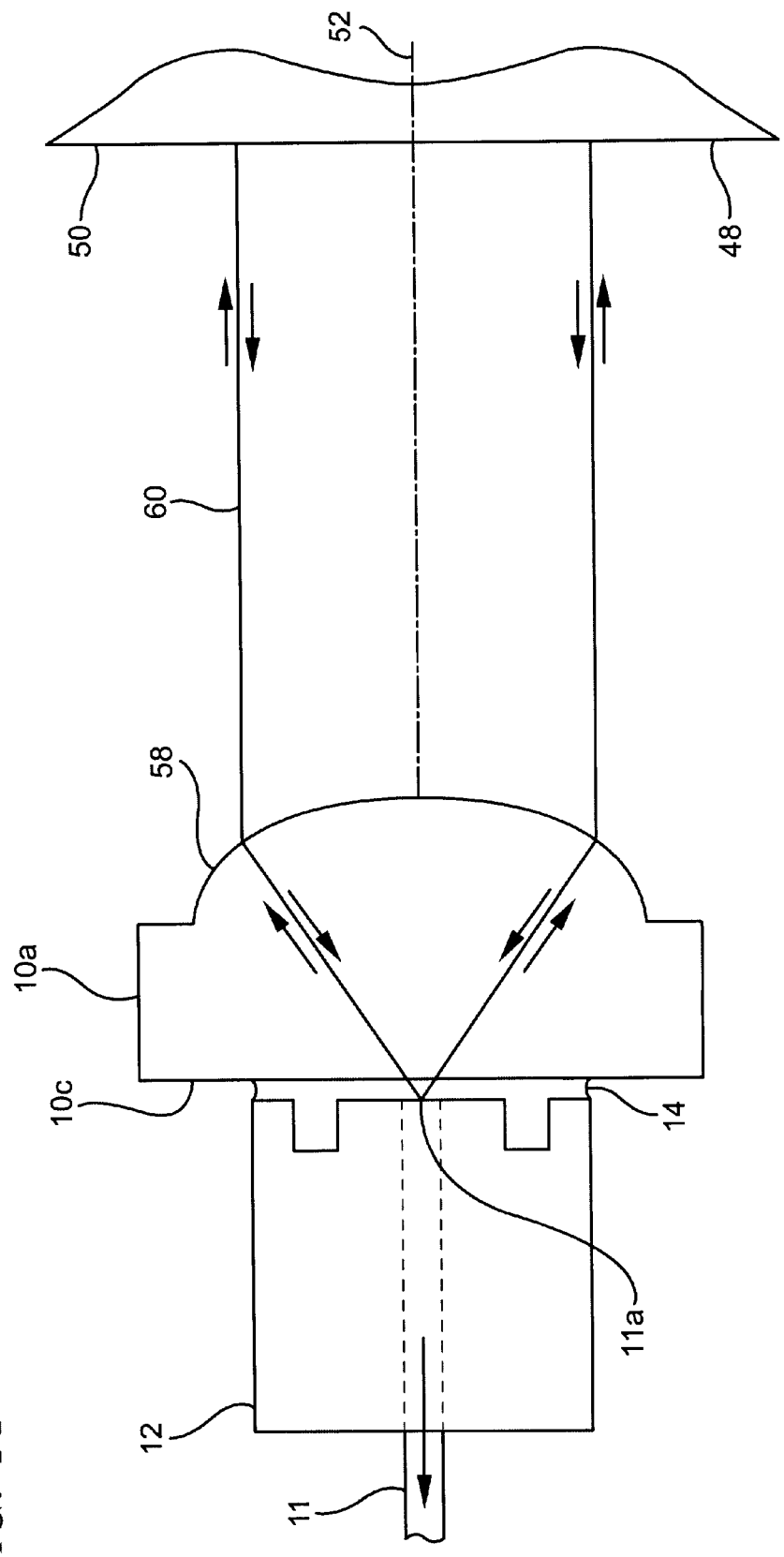
FIG. 11 is an optical diagram showing the fiber during alignment with respect to one of the lens of the array by propagating light (or optical signal) through the fiber and lens to the mirror of FIG. 10, and the returning of reflected light (or optical signal) through the lens and fiber when the fiber in the ferrule is properly aligned to the lens.
Figure 12:
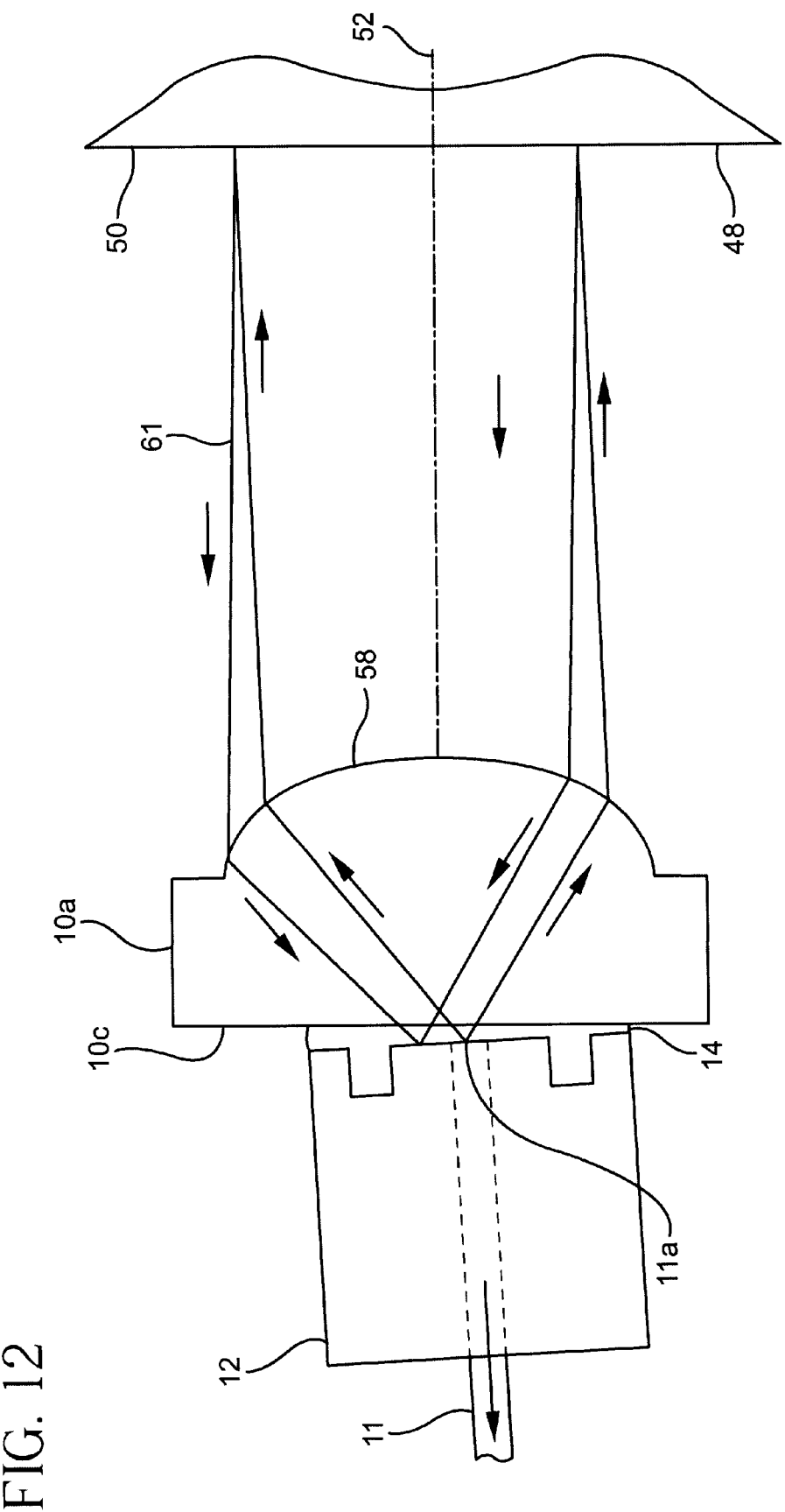
FIG. 12 is an optical diagram similar to FIG. 11 showing the fiber being aligned with respect to one of the lens of the array by propagating light through the fiber and lens to the mirror of FIG. 10 and the returning of reflected optical signal through the lens and fiber when the fiber in the ferrule is not properly aligned to the lens.

As shown in FIGS. 11 and 12, the output end 11a of the optical fiber 11 of fiber element 15 is positioned to the input of a single lens 58 of array 10, so that the adhesive 14 contacts the back surface 10c of the array 10. An optical signal propagates from the input of the optical fiber 11 and through the output of the optical fiber into the lens 58. The optical signal is collimated by the lens 58 and propagates to the mirror 48. The optical signal is reflected by the reflective surface 50 of the mirror, and propagates back to the lens 58. If the output of the optical fiber element 15 is well aligned to the lens 58, as shown in FIG. 11, the optical signal will be collimated along the axis 52 of the lens 58, and will be reflected substantially along that axis. The optical signal will reenter the lens 58 and will be substantially coupled into the output end 11a of the optical fiber 11. The optical signal will propagate from the output end toward the input end of the optical fiber element, and a fraction of the optical signal will be coupled by optics to the optical power detector, which in the case of a properly aligned fiber will detect a relatively high amount of reflected power.

If the output of the optical fiber element is not well aligned to the lens 58, as shown, for example, in FIG. 12, the optical signal will not be well collimated along the axis 52 of the lens 58. The optical reflected signal 61 from the mirror 48 may only partially reenter the lens 58. As the reentering optical signal will not be well aligned to the lens, it will not be well coupled to the output end 11a of the fiber 11, and the detector will detect a relatively low amount of power. The amount of optical power detected will increase with the quality of the alignment of the output of the optical fiber element to the collimating element.

Figure 13:
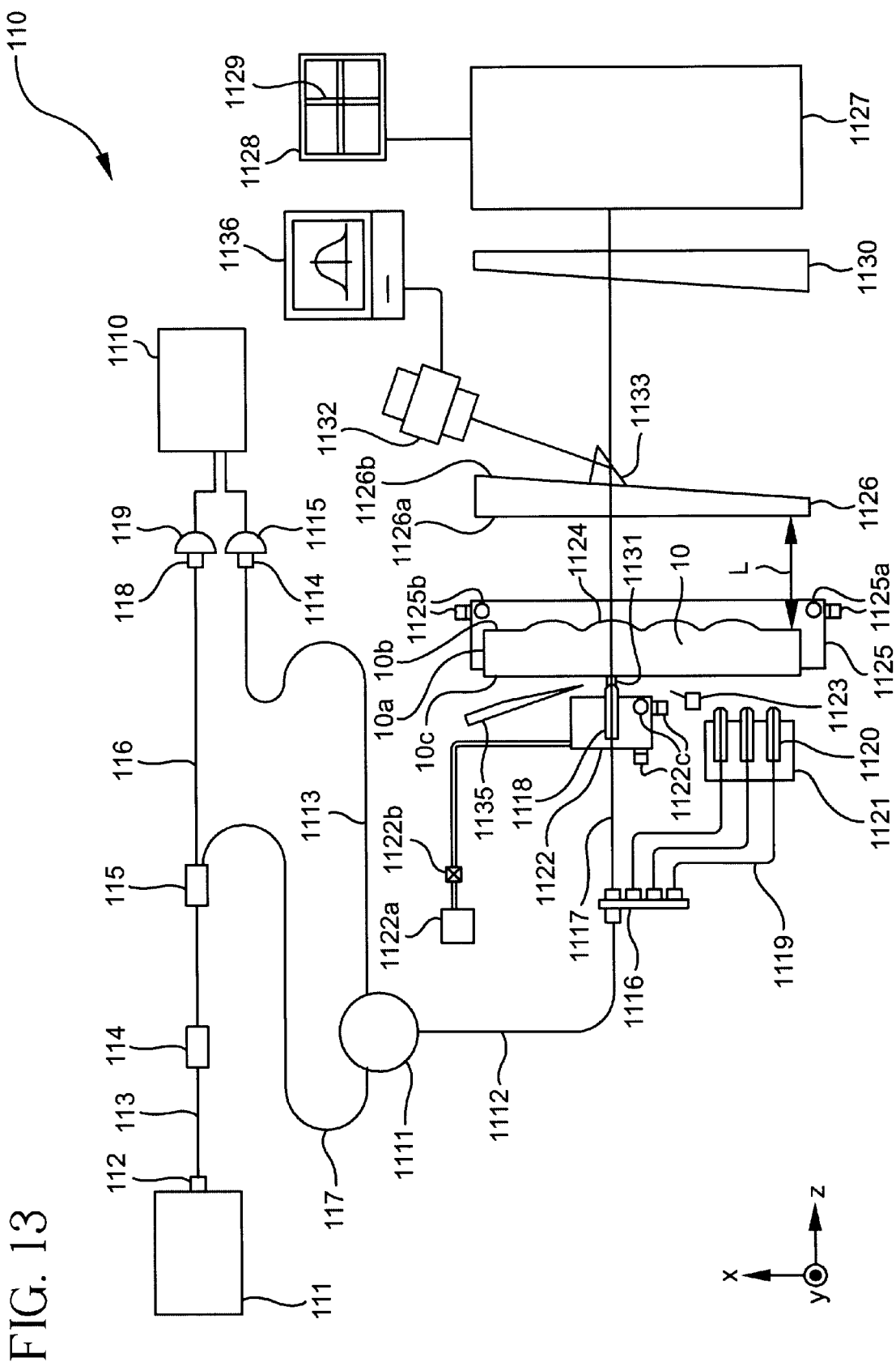
FIG. 13 is a block diagram of a system for aligning optical fibers to the lens array in accordance with the present invention.
Figure 14:
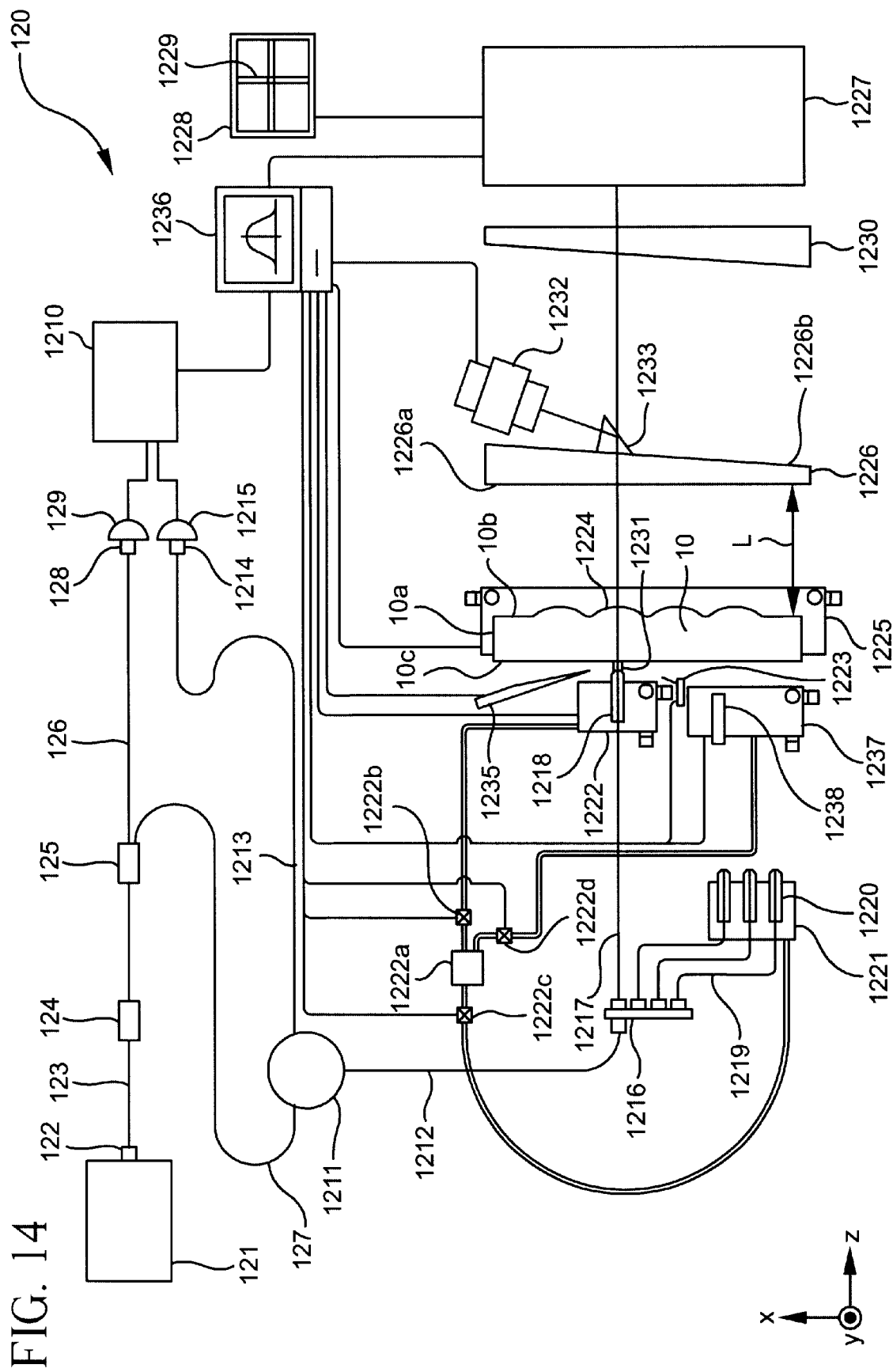
FIG. 14 is a block diagram of the system for automatically aligning optical fibers to the lens array in accordance with the present invention.

The position and angle of the output of the optical fiber element are adjusted to maximize the optical power, or amount of reflected light, detected at the detector. This may be done manually, as shown in FIG. 13 or more preferably, by a computer or an electronic device using a feedback loop, as shown in FIG. 14. When the position and angle of the output of the optical fiber are maximized, the adhesive bridging the output of the optical fiber and the back of the array is cured (or fixed), for example by the application of actinic radiation or heat. For example, in the case of ultraviolet curable adhesive material, the actinic radiation would be ultraviolet light. The alignment tool is then detached. Each optical fiber 11 is attached in this method, continuing until all desired fibers are attached to array 10.

Figure 13A:
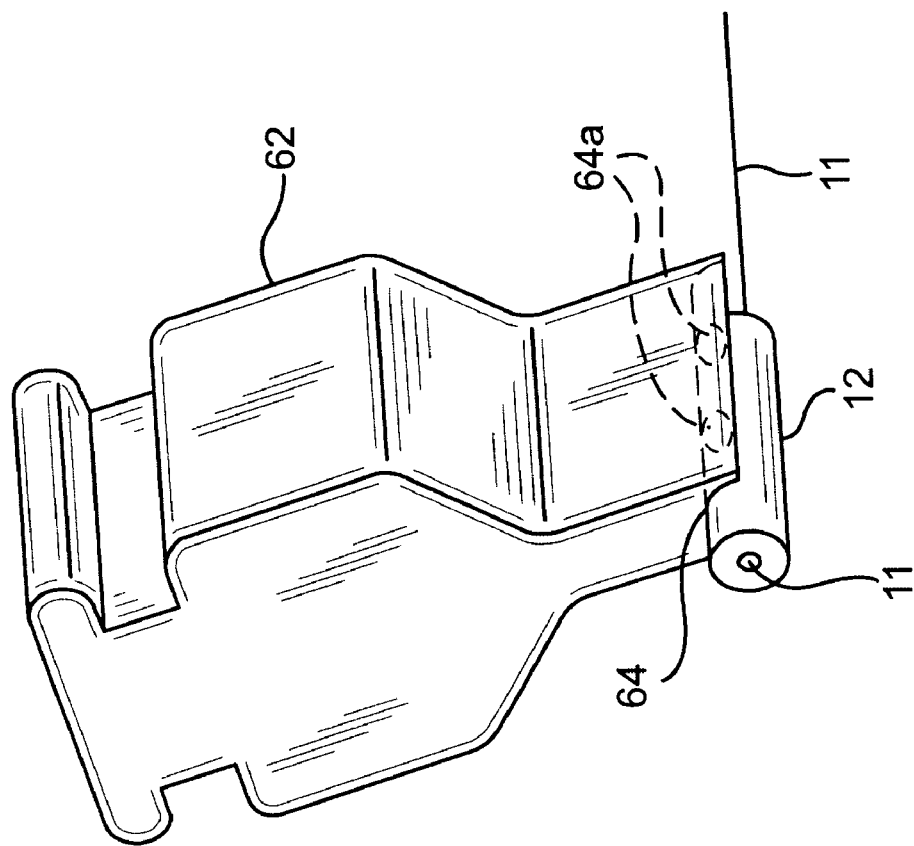
FIG. 13A is the perspective view of a holder of the ferrule's fiber during the alignment of the fiber to the lens array absent stages for moving the holder.

Referring to FIG. 13, a system 110 using the method described above is shown to align multiple fibers 11 to an array 10 of lenses. A radiation or light source 111 is coupled into an optical fiber 113 using a connector 112. The radiation source may be, for example, a laser, amplified stimulated emission (ASE) source, or a monochromator-tuned source, depending on the desired wavelength or frequency, signal to noise level, and the accuracy required of the measurements taken. For example, the ASE source has the advantage of reduced coherence length compared to a laser and therefore more stable measurements since interference effects are less of a consideration. The fiber 113 can be connected to an optical isolator 114 if back-reflections adversely affect the optical stability of the source. The fiber 113 is then connected to a 1×2 splitter 115 that splits 10% of the emerging radiation into one fiber 116 and 90% into the second fiber 117. However, other percentages than 10% and 90% may be used. The first fiber branch 116 is coupled by a connector 118 to a detector 119 that measures power emerging from the fiber. For example, detector 119 may be a single element detector, such as a photodiode. A power meter 1110 detects and measures the electrical signal from the detector 119. In this manner, the output power of the radiation source can be monitored. For example, the light produced by source 111 and detected may be at infrared wavelength(s), such as at 1.55 μm, or other wavelength(s) may be used. The second branch 117 is connected to a circulator 1111. The circulator has two output fibers 1113 and 1112. The first output fiber 1113 of the circulator is coupled to a detector 1115 using a connector 1114. The same power meter 1110 that receives an electrical signal from the input power detector 119 also is connected to the detector 1115 that measures the reflected signal from fiber being aligned to a lens of the array 10. The second output fiber 1112 of the circulator 1111 is connected to the bulkhead 1116 coupled to the inputs of a set of fibers. Bulkhead 1116 may represent earlier described connector 44 (FIG. 8). Due to the operation of the circulator 1111, none of the radiation from fiber 117 is transmitted into fiber 1113, but rather, nearly 100% of it is transmitted into the fiber of 1112. The circulator's output fiber 1112 is connected to a fiber 1117 that is attached to a ferrule 1118. In general, the bulkhead 1116 will have a multitude of fibers 1119 that may be connected to ferrules 1120 that are placed onto a carrier fixture 1121 that may have V-grooves, vacuum, or other means to hold the fibers or ferrules in place. These additional fibers are waiting to be aligned and attached to the array 10. The fiber that is being aligned is held in place by a fixture or holder 1122 that contains a fiber or ferrule vacuum actuated chuck or holder 62, as shown for example in FIG. 13A, mounted to precision x, y, z mechanical stages. This holder 1122 and stages represent the alignment tool referred to earlier in connection with FIG. 10. The holder 62 has a surface 64 which is shaped to receive the outer surface of at least part of the ferrule, such as at 45 degrees, and one or more openings 64a (shown as dashed-lines) in this surface to retain the ferrule by vacuum applied from a vacuum source 1122a. The vacuum source 1122a has a controller, such as a valve 1122b, coupled to the holder 1122, via a tube, to control the amount of vacuum between a zero (or near zero) level to release a ferrule, and at least a low level and a high level.

The alignment process begins by mounting the substrate 10a of lens array 10 into a fixture 1125. This fixture 1125 has the ability to tip and tilt in order to adjust the front surface 10b of the array's substrate 10a parallel to the reflective planar surface 1126a of a reference wedge or mirror 1126 facing array 10. Tip and tilt stages may be coupled to this fixture 1125 having two orthogonal rotational axes which may be manually adjusted by control knobs 1125a coupled to these stages. This fixture 1125 and its coupled stages represent the alignment fixture referred to earlier in connection with FIG. 9. Feedback for alignment to reference wedge 1125 may be accomplished using an autocollimator 1127. The autocollimator 1127 may be a conventional autocollimator which projects collimated light towards the reference wedge and substrate 10a. The reflected light from the substrate's front surface 10a and the reference wedge surface 1126a facing the substrate is collected by the autocollimator 1127, and the signals detected are displayed on a monitor 1128 in the form of two crosshairs 1129, one for each of the two surfaces. Alternatively, light may be reflected from the back surface 10c of the substrate, instead of the front surface 10b. The two surfaces are aligned parallel to each other when the two crosshairs fall on top of each other. The operator tips and/or tilts the array until the two surfaces are substantially parallel. The autocollimator 1127 provide the collimate light at a wavelength which will be reflected back by surfaces 1126a and 10b to the autocollimator. Other alignment feedback methods may be used, such as the use of an interferometer and the checking of parallelism by tip/tilting the substrate until the fringes viewed are nulled.

To view the sharpest crosshairs on monitor 1128, and thereby achieve the highest alignment accuracy, the front surface 10b of the substrate and the reference wedge surface 1126a are flat to a fraction of the wavelength of the light used by autocollimator 1127. The signal may be reflected off of the flat area between lens to lens or the flat area of the front surface 10b that borders outside the area of the lenses of the array. To improve contrast of the crosshairs, one can also AR-coat the second surface 1126b of the reference wedge (the side facing the autocollimator), AR-coat the back surface 10c of the substrate outside of the lens array area, and/or place a wedge 1130 that is AR-coated on both sides and compensates for the optical aberrations which may be caused by the first wedge 1126. The reflective surface 1126a may represent the reflectance surface 50 of mirror 48 of FIG. 9.

A separation distance L is provided between the reference wedge 1126 and the substrate 10a. This distance L depends upon the distance that the collimated radiation must propagate in the eventual optical device or system into which the collimator array assembly with attached aligned fibers will be used and the presence of any diffracting apertures, such that optimal separation distance L is used to ensure minimum insertion loss in such optical device or system.

By aligning the substrate of the array 10 to the reference wedge and constantly monitoring that that alignment does not drift through the use of the autocollimator, it allows an operator to ensure that as he or she aligns each fiber to a lens that the beam emitted from the lens is pointing in the same direction as all of the other lenses in the array, and thus such beams from the array will be parallel to each other.

Once the array's substrate 10a is aligned to reflective surface 1126a, the ferrule 1118 to be aligned is moved forward by the operator using the z stage of holder 1122 until it touches (contacts) the back surface 10c of the substrate 10a and then resets the position of the z stage to zero. During this process, the vacuum applied to the ferrule 1118, via the holder 1122, is at a low level which enables the ferrule to slip backwards slightly when it touches back surface 10c. After touching, the vacuum is set to a high level and the ferruled fiber is retained without possible movement in the holder 1122. The operator then moves the ferrule moved away from the substrate in z, and a drop of adhesive 1131 (such as earlier described adhesive material 14) is placed on the ferrule surface facing the substrate using a precision dispenser 1135 (for example, a dispenser sold by EFD, Inc. of Providence, R.I.). The precise control of the volume of adhesive applied to each ferrule is important to ensure proper bonding and minimal spillover of the adhesive that may otherwise interfere with the bonding of neighboring ferrules. A video camera (not shown) may be used to view the front surface of the ferrule to facilitate the operator locating the adhesive drop onto the ferrule. Using the z stage of holder 1122, the ferrule is moved by the operator towards the back surface 10c of the substrate along the z-axis to a precalculated position for the focal spot of one of the lenses 1124 of the array 10, which represented the initial position of the ferruled fiber. This initial position can be calculated based upon the surface figure of the lens, material the lens is fabricated in, and the substrate material and thickness. The substrate may be fabricated such that the gap, first set to the initial position, between the back surface 10c and the fiber ferrule's front surface is optimal for achieving the desired mechanical strength of the particular adhesive material. For example, the initial position of the ferruled fiber may be 100 μm from the back surface 10c of the substrate.

The fiber position in x, y, and z is then adjusted from its initial position through feedback from the signal measured by the detector 1115 on power meter 1110. For example, the power meter may provide a number associated with the power of the light received on the detector, or an oscilloscope. This detector monitors radiation from the source 111 that is collimated by the lens 1124 and reflected back into the lens due to the reference wedge surface 1126a facing the lens. The light reflected back at the lens is coupled back into the fiber 1117, into fiber 1112, and then due to the operation of the circulator 1111 into fiber 1113, and finally detected by the detector 1115 and read on power meter 1110. By adjusting the position of the output end of the fiber in the ferrule using the x, y, and z stages coupled to holder 1122, the operator determines a position of the fiber which provides a maximum or peak detected reflected signal, thus locating the output end of the fiber into the focal point of lens 1124. For example, the operator may iteratively move each of such x, y, and z stages by control knobs 1122c and monitor the amount or level of the power signal on the meter 1110 until the maximum reflected light is received on the detector. Optionally, holder 1122 may have additional stages provide two or three rotational orthogonal axes for tip and tilt of the fiber in the ferrule retained in the holder in addition to x, y and z stages (see FIG. 10). However, preferably, the tip and tip of the holder 122 is aligned once with respect to the substrate, either after the substrate is aligned parallel to the reference wedge, or when the first ferrule is aligned to the substrate, such that subsequent ferrules in the holder will already have their front surface's substantially parallel to the back surface 10c of the substrate. Or in the case of an angled ferruled fiber, the ferrules will have their front surfaces at a desired angle with respect to the back surface 10c of the substrate.

To observe the beam quality of the collimated beam and to ensure that there is no asymmetric clipping of the beam, one can use a beam profiler 1132. Beam profiler 1132 represents any commonly used optical device enabling viewing on a monitor, coupled to a detector, to observe the quality or characteristics of the collimated beam. Beam profiler 1132 may be, for example, provided by a Beam-Scan® profiler manufactured by Photon, Inc. of San Jose, Calif. Radiation collimated by the lens is partially transmitted through surface 1126a by the reference wedge and incident a prism 1133. This prism reflects the radiation to the input aperture of the beam profiler, such that the signal from the beam profiler's detector is viewed on a monitor 1136 to determine when the beam is asymmetrically clipped, or if the beam exists, the presence of optical aberrations from the lens.

After the fiber is properly aligned, the adhesive 1131 can be cured. For the case of the adhesive being a UV-curable polymer, the curing process would entail turning on a UV source and irradiating the polymer until it is cured. For example, a UV lamp 1123 coupled to fiber optic directed to the adhesive to be cured may be used. To decrease alignment time for the entire array, the cure time may be made only so long as is required to sufficiently tack the fiber in place. After all the fibers are aligned and tacked in place, the entire array can be fully cured for maximum mechanical strength of the fiber bonds.

Once a single fiber is aligned and bonded, the vacuum is removed (or reduced) to release the ferrule now attached to the substrate and aligned to lens 1124, and the operator then loads the next ferrule from fixture 1121 into holder 62 and applied vacuum to retain the ferrule and thus the fiber therein. The position of the substrate 10$a$ is indexed in either x or y to bring the next lens of the array 10 into position in front of the holder. Fixture 1125 has two mechanical x, y translation stages having control knobs 1125$b$ for the operator to index the system 110 to the next lens. For example, if the next lens is in the same row, the x translation stage is moved which will align the holder 1125 to a position to place the optical axis of the ferruled fiber in the holder in near (or estimated) optical axis of the next lens. If the next lens is in the next row, the y translation stage also have to be moved, in addition to or instead of the x translation stage, depending on whether to index to the start of each row of the array. Alternatively, the holder 1122 may similarly indexed in x and/or y directions, rather than the fixture 1125 holding the lens array. Alignment of the parallelism of the substrate to the reference wedge need to not be repeated if initially the movement of these x, y stages have been pre-aligned to be parallel with the surface 1126$a$ of the reference wedge. The alignment process described above is then repeated. Preferably, the fibers are attached in order of the lens row by row from the bottom to the top of the array. For example, the array 10 may be a 16 by 20 lens array requiring alignment and attachment of 320 fibers.

One important advantage of the method is that the reference wedge never moves with respect to the autocollimator. Therefore, a reference is always provided with which to establish the pointing of the collimated beams emitted by the lenses. This is critical when pig-tailing fibers to microlens arrays that may have hundreds or even thousands of lenses. The pig-tailing operation for the entire microlens array can therefore be time consuming and the reference wedge/autocollimator alignment reference technique allows operators to recover if the fixture holding the microlens substrate drifts during this time or is accidentally bumped. The alignment method can repeatedly align fibers to lenses to better than 0.3 um errors in x and y, and less than 5 um in z. Angular pointing errors across an array will depend upon the focal length of the array, and will be given by $\Delta r/f$ in radians where $\Delta r = \text{sqrt}(\Delta x^2 + \Delta y^2)$ is the radial error of the alignment in the x-y plane and f is the focal length of the lens.

Optionally, system 110 may be used to estimate insertion loss of the fiber collimators. First the losses in the system are calibrated by measuring the back-reflections of a ferruled fiber 1118 when the fiber end is exposed to air and does not have any adhesive on it. The reflectivity of the fiber face can be calculated. For example, at a wavelength of 1.55 um, the mode index of a Corning SMF28 fiber is 1.4467. For an uncoated fiber tip (output end), the reflectivity of the fiber face will be 3.33% or −14.8 dB. This number can serve to calibrate the ratio of the readings measured by detectors 119 and 1115. After each fiber is aligned and attached to a microlens, the collimated radiation is retroreflected by the reference wedge back into the fiber, and the power measured by detector 1115. By knowing the reflection coefficient of the reference wedge, one can calculate the insertion loss of the double-pass collimator assembly for that particular fiber. An advantage of the alignment method is then that at the same time that the collimator array is assembled, one can simultaneously collect data on channel-to-channel insertion loss (IL) for each aligned and attached fiber to the array 10.

Referring to FIG. 14, a system 120 is shown having elements which are the same as shown in FIG. 13 but includes a programmed computer system enabling automation. Reference numerals 111 to 1136 of FIG. 13 correspond to numeral 121 to 1236 in FIG. 14, respectively, and represent the same components. One of the differences between the manual and automated assembly was that in the manual assembly, the operator was manually loading the vacuum actuated holder 1122 with the next ferruled fiber 1118 to be aligned. In the automated system, the operator will load a preset number of fibers into a cassette or fixture 1221 having grooves capable of retaining ferrules. The ferrules are each retained in the cassette 1221 by vacuum independently controlled by the computer using valves 1222$c$, such as 16 values, along tubes from vacuum source 1222$a$. Each valve 1222$c$ controls vacuum to one or more openings in a different groove of the cassette 1221 capable of retaining the ferrule. In the case of MTP/8 ribbon fiber, a multiple of 8 fibers may be loaded in cassette 1221 at one time by the operator is a convenient number, such as 16 fibers. Once loaded, the operator informs the computer that the fibers are ready, such as by a user interface or a keyboard, touch screen, or mouse, of the computer system. In response, the computer automatically moves the x, y, z stages of holder 1222 to pick up one of the ferrules 1220 previously loaded in the cassette 1221, by controlling the one of valves 1222$c$ to remove the vacuum holding the ferrule in the cassette and controlling valve 1222$b$ to apply vacuum to retain the ferrule in holder 1222, and then moves the x, y, and z stages to locate the retained ferrule in the holder to face the back surface 10$c$ of the substrate 10$a$. The holder 1222 and stages coupled thereto may operate like a robotic arm in accordance with software of the computer. Although less preferred, a separate vacuum chuck 1238 coupled to stages 1237 may be provided as shown in FIG. 14, and the computer automatically moves the x, y, z stages 1237 so that vacuum chuck 1238 is able to pick up one of the ferrules 1220 loaded in the cassette 1221 and transfer it to the holder 1222. The stages of holder 1222 and stages to the adhesive dispenser 1235 are also controlled by a computer 1236. Further, stages of fixture 1225 holding the len array's substrate are controlled by the same computer along with the beam profiler 1232 and the autocollimator 1227. The computer represents a computer system, such as a personal computer, for controlling all of the equipment, but multiple computer systems may also be used. With regards to the computer-control feedback that ties together the autocollimator and the stages of fixture 1225 holding the substrate 10$a$, the computer monitors for any movement of the crosshairs 1229, and the computer adjusts the tip and tilt stages of the fixture holding the substrate as necessary.

By controlling various stages to holder 1222 (and/or vacuum chuck 1238), adhesive dispenser 1235, and the lens array substrate's fixture 1225, curing lamp 1223, as well as valve 1222$b$ from the vacuum source 1222$a$ to holder 1222 (and/or value 1222$d$ from vacuum source 1222$a$ to chuck 1238), the computer is programmed to perform the same operations as performed by the operator in system 110 of FIG. 13. For each ferrule, the computer adjusts the stages of holder 1222 of the ferrule to determine a position which provides a maximum or peak signal on the power meter which outputs its readings to the computer, and when that position is found bonds the adhesive for the ferrule to the substrate. The computer may read the power meter at multiple points (positions) in x, y, z of the stages to the ferrule holder in iteratively moving one or more of such stages in a direction which will provide a maximum peak reflected signal, or may form plots in x, y, and z space and calculate the position where peak reflected signal is provided. Preferably, x, y, z stages of holder 1222 (or holder 1122 of FIG. 13) have an accuracy of about 20 nanometers resolution, but other resolution accuracy may be used. The stages of holder 1222 (and other stages in system 120), and the software operating on the computer 1236 for controlling such stages in a feedback control loop to locate the peak reflected signal of each fiber when in the holder, are available from Aerotech, Inc. of Pittsburgh, Pa. If other stages are coupled to the holder providing one or more rotational axes, the computer may also control such stages in locating the peak reflected signal. For example, if 16 fibers are held in the cassette 1221, the computerized system is aligning, dispensing polymer adhesive, and bonding (exposing the polymer to UV radiation) by turning on an off a UV lamp in the case of a UV-curable epoxy, as the bonding polymer these fibers to the back of the substrate, while the operator is loading the next batch of 16 fibers in the cassette.

Although the above process described pig tailing of ferruled fibers to the backs of microlens substrates, the process will work with fibers without ferrules. The high precision with which fiber ferrules are typically made with (e.g., OD within +/−1 um and ID within +/−1 um) is not required since the described pig-tailing method relies upon active alignment and does not require the mechanical referencing off of a precision mechanical datum of the ferrule.

The alignment process is independent of the exact form of the lens. For example, the microlenses of may be surface-relief structures, or achieve their optical power through a gradient in the substrate's index of refraction and therefore the surface of the lens will be flat. A combination of a surface relief and a gradient index is also possible to achieve the desired microlens properties.

The alignment method provides for alignment of fibers to an array of lens and can be used for aligning any individual sources to an array of microlenses, or arrays of sources to a single array of microlenses, and likewise individual microlenses, or several arrays of microlenses can be aligned to a single array of sources.

Although the lens array 10 has no alignment marks or apertures (or holes) on the back surface 10c of its substrate for locating fibers, such as in U.S. Pat. No. 5,346,583, the alignment method and system described herein may be used with the substrate having alignment marks or apertures for positioning each fiber with respect to a lens of the array. However, unlike U.S. Pat. No. 5,346,583 or other mechanical enmasse alignment approaches such as described earlier, each fiber 11 is individually positioned with respect to a lens of the array 10.

The assembly method described herein for a collimator array results in many advantages. The high precision necessary to produce highly parallel collimated optical signals is assured by the active alignment process. The use of a single reflective surface of a mirror or reference wedge reduces the degrees of freedom in the alignment, which simplifies the alignment process. Further, the use of a single reflective surface aligned perpendicular to the desired collimation axis ensures that each beam will be optimally collimated along that axis, even if individual lenses are slightly askew or have differences in focal length. Thus, so long as the reflective surface of the mirror or reference wedge remains in a fixed relationship with the lens array's substrate during alignment of all fibers to the lenses of the array, even in the absence of parallelism between the substrate's front surface (and back surface) with the reflective surface, the beams will be parallel to each other from the lenses of the array. The resulting assembled array with fibers may be adjusted in the system in which the array will be used to direct the beams in the desired direction. Preferably, the system 110 or 120 uses illumination of wavelength(s) in aligning the fibers to the array which are similar to that used in the system in which the array will be used.

The ferrules with the adhesive retaining regions are also advantageous. The lens of the array may be spaced closely in an array, since the degree of adhesive protrusion is greatly decreased. An increase in density of optical ports (i.e., lenses) allows higher port counts to be achieved for a given device size. The process is very tolerant to an excess to applied adhesive, as the excess adhesive is contained by the retaining regions or features.

From the foregoing description, it will be apparent that there has been provided an improved method for aligning optical fibers to a lens array, manual and automated systems for performing such method, and a collimator array of the lens array with aligned attached fibers. Variations and modifications in the herein described method, systems, and collimator array assembly, in accordance with the invention will undoubtedly suggest themselves to those skilled in the art. Accordingly, the foregoing description should be taken as illustrative and not in a limiting sense.

What is claimed is:

1. A method for aligning optical fibers to a lens array having a substrate with a front surface providing a plurality of lenses in said lens array and a back surface for input or output of light for said lenses, said method comprising the steps of:

providing a planar reflective surface facing said front surface of said lens array;

locating the end of one of said fibers adjacent said back surface of said lens array to face one of said lenses of said array;

propagating light through said one of said fibers and said lens facing the fiber to said planar reflective surface, and receiving returned reflected light from said reflective surface through said one of said fibers and the lens facing the fiber;

adjusting the position of the end of said one of said fibers to change the amount of said returned reflected light received by the fiber to determine when the end of the fiber is at a position which provides a maximum amount of said returned reflected light; and attaching the end of said one of said fibers to said back surface of lens array at said position which provides a maximum amount of said returned reflected light, in which said propagating, adjusting, and attaching steps are repeated for each of said fibers to different ones of said lenses of said array.

2. The method according to claim 1 further comprising the step of aligning said planar reflective surface substantially parallel with one of said front and back surfaces of said lens array.

3. The method according to claim 1 further comprising the steps of applying adhesive to the end of said one of the fibers, and attaching step further comprises the step of fixing said adhesive when the end of said one of said fibers is at said position providing a maximum amount of said returned reflected light.

4. The method according to claim 3 wherein said adhesive is a ultraviolet light curable adhesive, and said fixing step is carried out by applying ultraviolet light to cure said adhesive.

5. The method according to claim 1 wherein each end of said fibers has a ferrule through which the fiber extends and said ferrule has a front surface substantially planar with the end of said fiber.

6. The method according to claim 5 wherein said locating and adjusting steps are carried out with the aid of a holder having a surface shaped to receive said ferrule of one of said fibers and one or more openings to said surface of said holder, in which the said ferrule has an outer surface of which at least a portion is retained on said surface by said vacuum through said openings, and said holder has one or more stages coupled to said holder for translating said holder in different dimensions, and the end of each of said fibers is released from said holder after said attaching step to enable another one of said fibers to be retained in said holder for said locating and adjusting steps.

7. The method according to claim 5 wherein said locating step further comprises the steps of:
locating said end of said one of said fibers in said ferrule at a distance from said substrate to enable placement of adhesive upon said end of said fiber in said ferrule;
placing a drop of adhesive upon said end of said fiber in said ferrule; and
locating said end of said fiber in said coupler to a distance from said substrate which provides a gap into which said adhesive is located between the end of said one of said fibers and said back surface of said lens array, and wherein said attaching step further comprises the step of fixing said adhesive to bond said one of said fibers to said back surface at said position which provides a maximum amount of said returned reflected light.

8. The method according to claim 5 further comprises the steps of:
applying adhesive to the end of said one of the fibers; and
providing one or more regions along the front portion of the ferrule providing said front surface of the ferrule for retaining said adhesive when placed upon the end of the fiber and positioned adjacent said back surface of said lens array, wherein said attaching step further comprises the step of fixing said adhesive when the end of said one of said fibers is at said position providing a maximum amount of said returned reflected light.

9. The method according to claim 8 wherein said front portion of each said ferrule is chamfered, beveled, or has at least one groove providing a canal in said front surface of said ferrule.

10. The method according to claim 8 wherein said front surface of each said ferrule is angled with respect to said back surface of said lens array to provide said regions.

11. The method according to claim 8 wherein said front surface of each said ferrule is angled with respect to said back surface of said lens array, said front portion of each said ferrule is chamfered to provide said regions.

12. The method according to claim 1 wherein said locating, projecting, adjusting, and attaching steps are carried out for each of said fibers to different ones of said lens in succession in accordance with the order of said lenses in said array.

13. The method according to claim 1 wherein said planar reference surface is part of a mirror.

14. The method according to claim 1 wherein said projecting step further comprises providing light from a laser and passing said light through optics to said one of said fibers, and said adjusting step further comprises providing a detector for measuring the amount of reflected light in which said optics pass returned reflected light to said detector from said same one of said fibers.

15. The method according to claim 1 wherein at least said adjusting step is carried out automatically under control of a computer system.

16. The method according to claim 1 wherein said moving step comprising the step of moving the fiber interactively between two or more orthogonal dimensions until the fiber is at a position which provides a maximum amount of said returned reflected light.

17. A system for aligning optical fibers to a lens array comprising:
a lens array on a substrate having a back surface and a front surface providing a plurality of lenses in an array;
a plurality of optical fibers each having two ends in which one of said ends is positioned in a ferrule;
a reference member having a planar reflective surface facing said front surface of said lens array;
means for individually locating each of said fibers at their ferrule adjacent said back surface of said lens array to face a different one of said lenses of said array;
means for each of said fibers when located adjacent said lens array for propagating light through the fiber and said lens facing the fiber to said planar reflective surface, and receiving returned reflected light from said reflective surface of said reference member through the fiber and the lens facing the fiber;
means for each of said fibers when located adjacent said lens array for adjusting the position of the end of the fiber to change the amount of returned reflected light received by the fiber to determine when the fiber is at a position which provides a maximum amount of said returned reflected light; and
means for attaching the end of said fibers to said lens array at said position which provides a maximum amount of said returned reflected light.

18. The system according to claim 17 further comprising means for positioning one of said front and back surfaces of said lens array substantially parallel to said reflective surface of said reference member.

19. The system according to claim 18 wherein said means for positioning one of said front and back surfaces of said lens array comprises:
one or more stages coupled to said lens array to enable at least pivoting of said lens array on one or more rotational axes; and
means for illuminating and collecting reflected illumination at one or more wavelengths from said reference surface and one of said front and back surfaces of said substrate; and
means for determining when said reference surface of said reference member and said one of said front and back surfaces are substantially parallel in accordance with said reflected illumination.

20. The system according to claim 17 wherein said lenses provide for one of collimating and converging light from said fibers.

21. The system according to claim 17 wherein said locating means provides a gap between said end of each fiber to said lens array in which adhesive is located in said gap for enabling said attaching means when said end of fiber is at a position providing a maximum amount of reflected light.

22. The system according to claim 17 wherein said locating means and adjusting means is enabled at said ferrule for each of said fibers by a holder and one or more stages coupled to said holder capable of positioning said holder.

23. The system according to claim 22 wherein said holder having a surface shaped to receive said ferrule of one of said fibers and one or more openings to said surface of said holder, in which the ferrule is retained on said surface by vacuum through said openings.

24. The system according to claim 23 further comprising means for providing and controlling said vacuum to said holder.

25. The system according to claim 23 wherein said vacuum is applied to openings of said holder at one or more levels providing different amounts of suction, and said locating means enables said holder with said one of said fibers with said vacuum at a low level to allow said end of said one of said fibers to slip in said holder when said end of the fiber reaches said back surface of said lens array, and then said vacuum at a high level to position the end of said one of said fibers with respect to the back surface of the lens array.

26. The system according to claim 17 further comprising means for applying adhesive to the end of said one of the fibers, wherein each said ferrule of said fibers has one or more regions along the front portion of the ferrule providing said front surface of the ferrule for retaining excessive said adhesive when placed upon the end of said one of said fibers and positioned adjacent said back surface of said lens array, and said attaching means having means for bonding said adhesive to said couple said fiber to said substrate.

27. The system according to claim 26 wherein said front portion of each said ferrule is chamfered, beveled, or has at least one groove providing a canal in said front surface of said ferrule.

28. The system according to claim 26 wherein said front surface of each said ferrule is angled with respect to said back surface of said lens array to provide said regions.

29. The system according to claim 26 wherein said front surface of each said ferrule is angled with respect to said back surface of said lens array, said front portion of each said ferrule is chamfered to provide said regions.

30. The system according to claim 17 further comprising means for maintaining the substrate of said lens array in a fixed relationship with said reflective surface of said reference member.

31. A system for aligning optical fibers to a lens array comprising:
  a lens array on a substrate having a back surface and a front surface providing a plurality of lenses in an array;
  a plurality of optical fibers each having one end for attachment to the lens array;
  a reference member having a reflective surface facing said front surface of said lens array;
  means for locating the one end of each of said fibers adjacent said back surface of said lens array to face a different one of said lenses of said array;
  means for each of said fibers when located adjacent said lens array for propagating light through the fiber and said lens facing the fiber to said reflective surface, and receiving returned reflected light from said reflective surface of said reference member through the fiber and the lens facing the fiber;
  means for each of said fibers when located adjacent said lens array for adjusting the position of the end of the fiber to change the amount of returned reflected light received by the fiber to determine when the fiber is at a position which provides a maximum amount of said returned reflected light; and
  means for attaching the end of said fibers to said lens array at said position which provides a maximum amount of said returned reflected light.

32. The system according to claim 31 wherein at least one end of each of said fibers has a ferrule through which the fiber extends and said ferrule has a front surface substantially planar with the end of said fiber, wherein said attaching means comprises means for attaching the end of fibers by an adhesive material, and each said ferrule having at least one region along its front surface for retaining any excessive amounts of said adhesive.

33. A collimator array comprising:
  an array of a plurality of lenses located on a substrate having a back surface;
  a plurality of optical fibers each having one end coupled by adhesive to said back surface of said substrate in optical communication to a different one of said lenses; and
  a ferrule at said one end of each of said fibers having at least one region for retaining excess of said adhesive joining said the fiber to said lens array to avoid the adhesive protruding upon said back surface of said substrate.

34. The collimator array according to claim 33 wherein said ferrule at said one end of each of said fibers is one of chamfered, angled, chamfered and angled, or has at least one groove, to provide said region for retaining excess adhesive.

35. A collimator array comprising an array of a plurality of lenses located on a substrate having a substantially flat back surface in which each said array has an optical axis, and a plurality of optical fibers each having one end coupled by adhesive to the part of said back surface of said substrate being substantially flat and coaxially with the optical axis of a different one of said lenses, in which each of said fiber are individually positioned with respect to said array.

36. A system for attaching optical fibers to a lens array comprising:
  a lens array on a substrate having a back surface and a front surface providing a plurality of lenses in an array;
  a plurality of optical fibers each having one end for attachment to the lens array;
  a holder for retaining the end of each one of the fibers for attachment to the lens array having stages for moving the holder, in which said holder is located adjacent said back surface of said lens array to face one of said lenses of said array;
  a reference member having a reflective surface facing said front surface of said lens array;
  a source for illumination and optics for illuminating the one of said fibers in said holder with illumination from said source and receiving returned illumination from the one of said fibers in said holder from said reflective surface of said reference member via one of said lenses of the lens array;
  a detector for receiving at least the returned illumination from said optics and measuring the amount of the returned illumination;
  each of said fibers when retained in said holder is located using one of more of said stages to a position enabling a maximum amount of said returned illumination at said detector in which said returned illumination propagated through the fiber through one of said lenses of the array from the reflective surface; and adhesive material located between each of said fibers when retained in said holder and the back surface of said lens array capable of attaching the fiber to the lens array when the fiber is at the position providing maximum amount of said returned illumination at said detector.

37. The system according to claim 36 wherein the one end of each of said fibers for attachment to the array extends through a ferrule.

38. The system according to claim 37 wherein each said ferrule has a front surface having at least one region for retaining any excessive amounts of said adhesive when attached to said lens array.

39. The system according to claim 36 wherein said substrate of the lens array is located in a fixture having one or more stages for indexing the lens array to present each of said fibers when retained in said holder to a different lens of the array for attachment of the fiber to the array.

40. The system according to claim 39 wherein said stages of said holder present each of said fibers when retained in said holder to a different lens of the array for attachment of the fiber to the array.

41. The system according to claim 36 further comprising a computer system coupled to said stages of said holder to enable locating each of fibers when retained in the holder to a position enabling a maximum amount of said returned illumination at said detector.

42. The system according to claim 36 wherein said stages of said holder are manually positioned to locate each of fibers when retained in the holder to a position enabling a maximum amount of said returned illumination at said detector.

43. The system according to claim 36 wherein the amount of returned illumination detected by the detector is recorded for each of said fibers when attached to said lens array to provide a measure of insertion loss.

* * * * *